(12) United States Patent
Wu

(10) Patent No.: US 11,599,729 B2
(45) Date of Patent: Mar. 7, 2023

(54) METHOD AND APPARATUS FOR INTELLIGENT AUTOMATED CHATTING

(71) Applicant: MICROSOFT TECHNOLOGY LICENSING, LLC, Redmond, WA (US)

(72) Inventor: Xianchao Wu, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 166 days.

(21) Appl. No.: 16/622,228

(22) PCT Filed: Jun. 15, 2017

(86) PCT No.: PCT/CN2017/088405
§ 371 (c)(1),
(2) Date: Dec. 12, 2019

(87) PCT Pub. No.: WO2018/227462
PCT Pub. Date: Dec. 20, 2018

(65) Prior Publication Data
US 2021/0150150 A1    May 20, 2021

(51) Int. Cl.
*G06F 40/35* (2020.01)
*G06N 3/04* (2006.01)
(Continued)

(52) U.S. Cl.
CPC ............ *G06F 40/35* (2020.01); *G06N 3/045* (2023.01); *G06N 3/088* (2013.01); *H04L 51/04* (2013.01); *G06F 40/253* (2020.01); *G06F 40/295* (2020.01)

(58) Field of Classification Search
CPC ...... G06F 40/35; G06F 40/253; G06F 40/295; G06F 16/3329; G06N 3/0454; G06N 3/088; H04L 51/04
See application file for complete search history.

(56) References Cited

U.S. PATENT DOCUMENTS

| 7,505,892 B2 | 3/2009 | Foderaro |
| 7,861,252 B2 | 12/2010 | Uszok et al. |

(Continued)

FOREIGN PATENT DOCUMENTS

| CN | 101848187 A | 9/2010 |
| CN | 105591882 A | 5/2016 |
| CN | 106777135 A | 5/2017 |

OTHER PUBLICATIONS

Abdul-Kader, "Survey on Chatbot Design Techniques in Speech Conversation Systems", International Journal of Advanced Computer Science and Applications, 2015, pp. 72-80, (Year: 2015).*

(Continued)

*Primary Examiner* — Michael N Opsasnick
(74) *Attorney, Agent, or Firm* — Workman Nydegger

(57) ABSTRACT

The present disclosure provides a method for intelligent automated chatting. A conversation with a user is performed by using a first identity of a first artificial intelligence entity. A message is received from the user in the conversation. Matching rates between the message and trigger contents of other artificial intelligence entities are scored. A second artificial intelligence entity is selected from the other artificial intelligence entities based on the matching rates. A conversation with the user is performed by using a second identity of the second artificial intelligence entity by switching from the first identity of the first artificial intelligence entity to the second identity of the second artificial intelligence entity.

20 Claims, 14 Drawing Sheets

(51) Int. Cl.
*G06N 3/08* (2006.01)
*H04L 51/04* (2022.01)
*G06F 40/253* (2020.01)
*G06F 40/295* (2020.01)
*G06N 3/088* (2023.01)
*G06N 3/045* (2023.01)

(56) References Cited

U.S. PATENT DOCUMENTS

| | | | |
|---|---|---|---|
| 9,262,688 | B1 | 2/2016 | Zadeh |
| 9,369,410 | B2 | 6/2016 | Capper et al. |
| 2003/0220972 | A1 | 11/2003 | Montet et al. |
| 2009/0292778 | A1 | 11/2009 | Makar et al. |
| 2011/0078105 | A1 | 3/2011 | Wallace et al. |
| 2015/0169284 | A1* | 6/2015 | Quast ............... G06F 16/9535 704/275 |
| 2016/0035353 | A1* | 2/2016 | Chen ..................... G10L 13/08 704/235 |
| 2016/0044380 | A1 | 2/2016 | Barrett |
| 2016/0094492 | A1* | 3/2016 | Li ............................ H04L 51/04 709/206 |
| 2016/0307117 | A1* | 10/2016 | Yang ..................... G06N 20/00 |
| 2016/0314197 | A1 | 10/2016 | Chakra et al. |
| 2017/0068436 | A1* | 3/2017 | Auer ................... G06F 3/04883 |
| 2017/0180284 | A1* | 6/2017 | Smullen ................ H04L 69/14 |
| 2018/0075335 | A1* | 3/2018 | Braz ................. G06F 16/24522 |
| 2021/0150150 | A1* | 5/2021 | Wu ..................... G06F 16/3329 |

OTHER PUBLICATIONS

Sharma et al, "An Intelligent Behaviour Shown by Chatbot System", International Journal of New Technolgy and Research (IJNTR), vol. 3, Issue 4, Apr. 2017 pp. 52-54 (Year: 2017).*

International Search Report and Written Opinion for PCT/CN2017/088405, dated Sep. 30, 2017.

Berkan, Riza C., "Digital Cloning: How Expertise can be Commoditized by AI Driven Chatbots", Retrieved from https://www.linkedin.com/pulse/digital-cloning-how-expertise-can-commoditized-ai-berkan-ph-d, Mar. 22, 2017, 4 Pages.

Birdeau, Luke, "Combine Multiple Bots", Retrieved from http://web.archive.org/web/20170722113200/http://www.intwixt.com/blog/2016/12/28/combine-multiple-bots, Dec. 28, 2016, 4 Pages.

Maturi, Hareesh, "Meta Chatbot: Enabling Collaboration between Chatbots", Retrieved from: https://www.linkedin.com/pulse/meta-chatbot-enabling-collaboration-between-chatbots-hareesh-maturi, Dec. 26, 2016, 6 Pages.

"Chatbot", Retrieved From: https://en.wikipedia.org/w/index.php?title=Chatbot&oldid=785302257, Jun. 12, 2017, 6 Pages.

"Generative Adversarial Network", Retrieved From: https://en.wikipedia.org/w/index.php?title=Generative_adversarial_network&oldid=781462723, May 21, 2017, 3 Pages.

"Virtual Assistant", Rertieved From: https://en.wikipedia.org/w/index.php?title=Virtual_assistant&oldid=785408836, Jun. 13, 2017, 4 Pages.

"Extended European Search Report Issued in European Patent Application No. 17913928.2", dated Oct. 20, 2020, 12 Pages.

"First Office Action and Search Report Issued in Chinese Patent Application No. 201780054269.X", dated Feb. 11, 2022, 17 Pages.

"Second Office Action Issued in Chinese Patent Application No. 201780054269.X", dated Jul. 27, 2022, 10 Pages.

"Third Office Action Issued in Chinese Patent Application No. 201780054269.X", dated Nov. 3, 2022, 15 Pages.

* cited by examiner

1230

Does nobita like study?

Nobita doesn't like study. But you should learn from Sizuka, she studies so hard.

⇓   1232

Does nobita like study?

Nobita doesn't like study.

But you should learn from Sizuka, Sizuka studies so hard.

⇓   1234 subject   object
Nobita doesn't like study.

subject   AM
Sizuka studies so hard.

⇓   1236

<Nobita+study, negative>

<Sizuka +study, positive>

METHOD AND APPARATUS FOR INTELLIGENT AUTOMATED CHATTING

This application is a U.S. National Stage Application of PCT/CN2017/088405, filed Jun. 15, 2017, which application is hereby incorporated by reference. To the extent appropriate, a claim of priority is made to the above disclosed application.

BACKGROUND

Artificial intelligence (AI) conversational chat programs are becoming more and more popular. These conversational chat programs, also referred to as chatbots, allow users to carry on conversations with a virtual entity.

Chatbots are becoming an entrance for a lot of online services such as e-commerce, travel-assisting, location-based services of domains like restaurants, hospitals, shops and so on. It is relatively difficult for a user to download all kinds of chatbots and use them under different application scenarios.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure provide a method for intelligent automated chatting. A conversation with a user is performed by using a first identity of a first artificial intelligence entity. A message is received from the user in the conversation. Matching rates between the message and trigger contents of other artificial intelligence entities are scored. A second artificial intelligence entity is selected from the other artificial intelligence entities based on the matching rates. A conversation with the user is performed by using a second identity of the second artificial intelligence entity by switching from the first identity of the first artificial intelligence entity to the second identity of the second artificial intelligence entity.

It should be appreciated that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several exemplary implementations. It is to be understood that these implementations are discussed only for enabling those skilled in the art to better understand and thus implement the embodiments of the present disclosure, rather than suggesting any limitations on the scope of the present disclosure.

Figure 1:
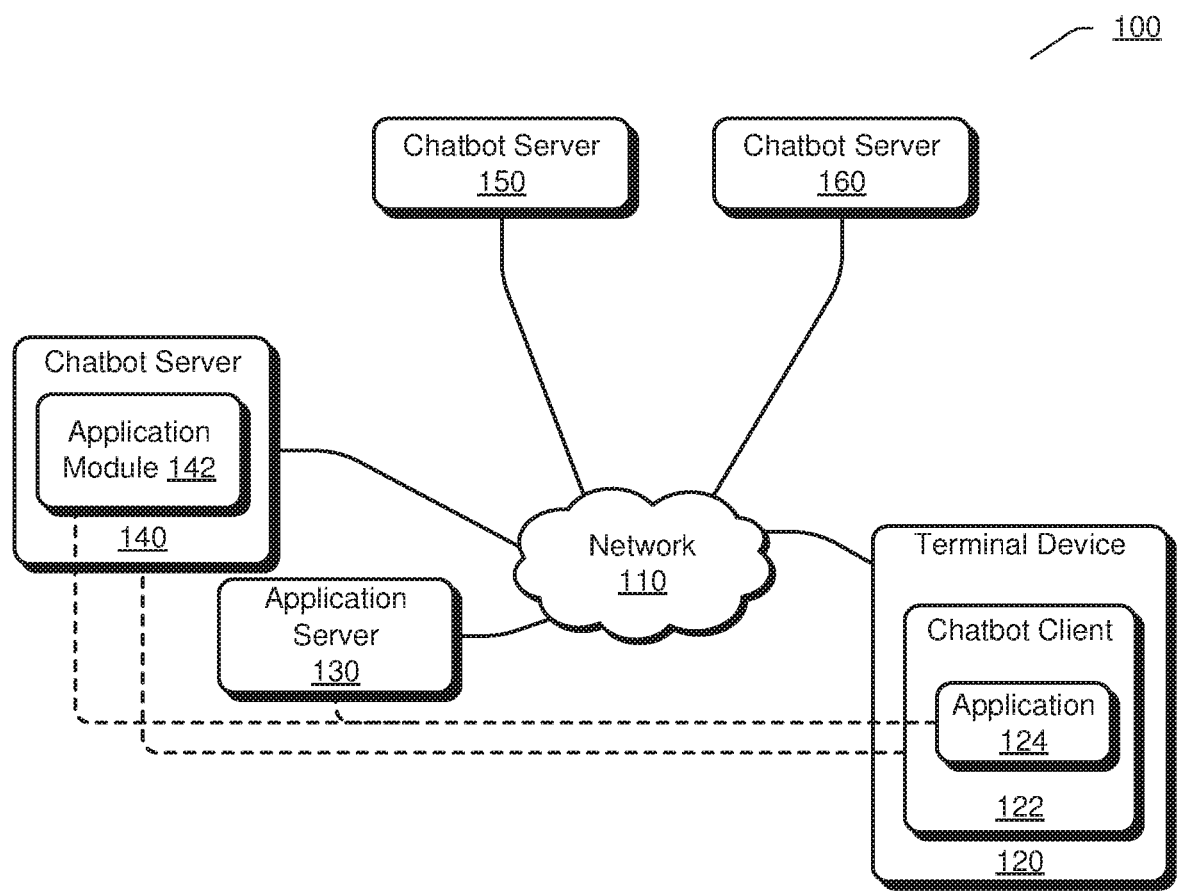
FIG. 1 illustrates an exemplary environment where the described techniques can be implemented according to an embodiment.

FIG. 1 illustrates an exemplary environment where the described techniques can be implemented according to an embodiment.

In the exemplary environment 100, a network 110 is applied for interconnecting among a terminal device 120, an application server 130 and chatbot servers 140, 150, 160.

The network 110 may be any type of networks capable of interconnecting network entities. The network 110 may be a single network or a combination of various networks. In terms of coverage range, the network 110 may be a Local Area Network (LAN), a Wide Area Network (WAN), etc. In terms of carrying medium, the network 110 may be a wireline network, a wireless network, etc. In terms of data switching techniques, the network 110 may be a circuit switching network, a packet switching network, etc.

The terminal device 120 may be any type of computing device capable of connecting to the network 110, accessing servers or websites over the network 110, processing data or signals, etc. For example, the terminal device 120 may be a desktop computer, a laptop, a tablet, a smart phone, etc. Although only one terminal device 120 is shown in FIG. 1, it should be appreciated that a different number of terminal devices may connect to the network 110.

The terminal device 120 may include a chatbot client 122 which may provide a chat service for a user. In some implementations, the chatbot client 122 at the terminal device 120 may be an independent client application corresponding to the chatbot service provided by the chatbot server 140. In some other implementations, the chatbot client 122 at the terminal device 120 may be implemented in a third party application such as a third party instant messaging (IM) application. Examples of the third party IM message comprise LINE™, MSN™, ICQ™, SKYPE™, QQ™, WeChat™ and so on.

The chatbot client 122 communicates with the chatbot server 140. For example, the chatbot client 122 transmits messages inputted by a user to the chatbot server 140, and receives responses associated with the messages from the chatbot server 140. The chatbot client 122 and the chatbot server 140 may be collectively referred to as a chatbot. As the conversation between the user and the chatbot is performed typically in a query-response manner, the messages inputted by the user are commonly referred to as queries, and the answers outputted by the chatbot are commonly referred to as responses. The query-response pairs may be recorded as user log data. It should be appreciated that, in some implementations, instead of interacting with the chatbot server 140, the chatbot client 122 may also locally generate responses to queries inputted by the player.

An application 124 may be activated during a conversation between the chatbot and a user. For example, the application 124 may be associated with a trigger word. The user may input the trigger word when the user wants to start the application 124 during the conversation. After receiving the trigger word, the chatbot may activate the application during the conversation.

In some implementations, the application 124 may be implemented at an application server 130, which may be a third party application server. For example, while the application 124 is active during the conversation, a query from a user is sent to the application server 130 via the chatbot, and a response from the application server 130 is sent to the user via the chatbot. In some other implementations, the application 124 may be implemented at the chatbot server 140, and in this case an application module 142 may be implemented at the chatbot server 140. Applications provided by the chatbot service provider and/or applications provided by third party application providers may be implemented at the application module 142. The chatbot may call an application at the application module 142 in order to activate the application during the conversation.

It should be appreciated that the application 124 associated with the chatbot service may also be referred to as a feature, a function, an applet, or the like, which is used to satisfy a relatively independent requirement of a user during a machine conversation with the user.

In addition to the chatbot 140, there may be various chatbots such as chatbots 150, 160 and so on in the system 100. The chatbots 150, 160 and so on may be domain-specific chatbots which provide various kinds of services such as e-commerce, travel-assisting, location-based services of domains like restaurants, hospitals, shops and so on. A user may install chatbot clients of these domain-specific chatbots 150, 160 at the user's terminal device, and get services by using the corresponding chatbot clients. However it would be time-consuming and difficult for the user to manage these domain-specific chatbots by hands, especially when there are a large number of domain-specific chatbots available. In an implementation of the disclosure, the chatbot 140, which is usually a general chatbot, acts as a unified platform to manage or integrate various kinds of chatbots 150, 160 and so on, which are usually domain-specific chatbots, so as to provide various kinds of services for the user via the unified platform.

It should be appreciated that all the network entities shown in FIG. 1 are exemplary, and depending on specific application requirements, any other network entities may be involved in the environment 100.

Figure 2:
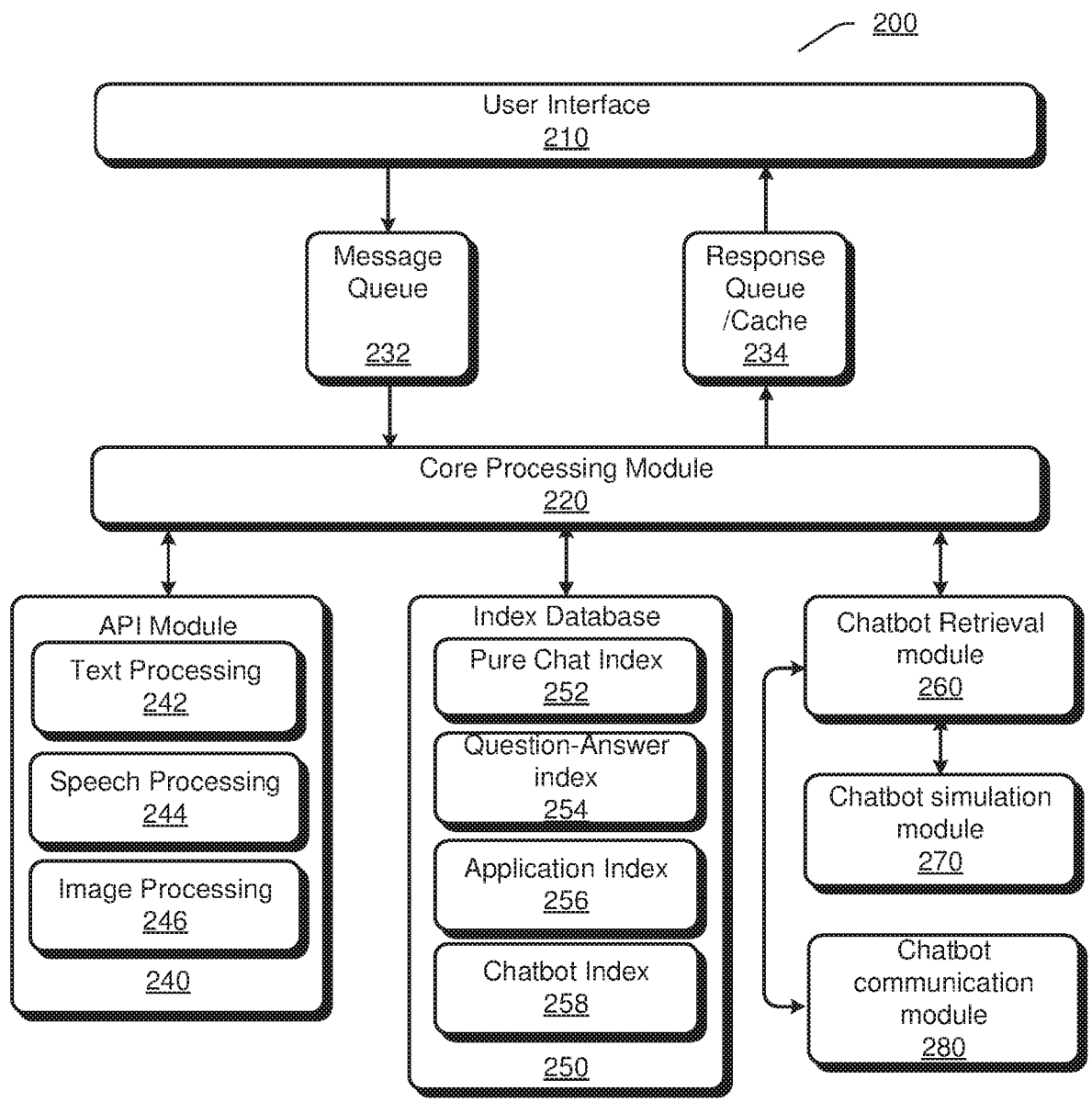
FIG. 2 illustrates an exemplary system applying a chatbot according to an embodiment.

FIG. 2 illustrates an exemplary chatbot system according to an embodiment.

The system 200 may comprise a user interface (UI) 210. The UI 210 may be implemented at the chatbot client 122, and provide a chat window for interacting between a user and the chatbot.

The queries input by the user via the user interface 210 are transferred to the query queue 232, which temporarily stores users' queries. The users' queries may be in various forms including text, sound, image, video, and so on.

The core processing module 220 may take the messages or queries in the query queue 232 as its input. In some implements, queries in the queue 232 may be served or responded in first-in-first-out manner.

The core processing module 220 may invoke processing units in an application program interface (API) module 240 for processing various forms of messages. The API module 240 may comprise a text processing unit 242, a speech processing unit 244, an image processing unit 246, etc.

For a text message, the text processing unit 242 may perform text understanding on the text message, and the core processing module 220 may further determine a text response.

For a speech message, the speech processing unit 244 may perform a speech-to-text conversion on the speech message to obtain text, the text processing unit 242 may perform text understanding on the obtained text, and the core processing module 220 may further determine a text response. If it is determined to provide a response in speech, the speech processing unit 244 may perform a text-to-speech conversion on the text response to generate a corresponding speech response.

For an image message, the image processing unit 246 may perform image recognition on the image message to generate corresponding text, and the core processing module 220 may further determine a text response. For example, when receiving a dog image from the user, the AI chat system may determine the type and color of the dog and further gives a number of comments, such as "So cute German shepherd! You must love it very much". In some cases, the image processing unit 246 may also be used for obtaining an image response based on the text response.

Moreover, although not shown in FIG. 2, the API module 240 may comprise any other processing units. For example, the API module 240 may comprise a video processing unit for cooperating with the core processing module 220 to process a video message and determine a response. For another example, the API module 240 may comprise a location-based processing unit for supporting location-based services.

An index database 250 may comprise a plurality of index items. The index items in the index database 250 may include a pure chat index set 252 and a question-answer pair index set 254, which can be retrieved by the core processing module 220 as responses. Index items in the question-answer pair index set 254 are in a form of question-answer pairs, and the question-answer pair index set 254 may comprise question-answer pairs associated with an application such as application 124. Index items in the pure chat index set 252 are prepared for free chatting between the user and the chatbot, and may or may not be in a form of question-answer pairs. It should be appreciated that the term question-answer pair may also be referred to as query-response pair or any other suitable terms. Taking the query "Rinna, how old are you" as an example, the core processing module 220 may determine a response "second year of primary high school" through the pure chat index set.

The index items in the index database 250 may also include an application index 256 and a chatbot index 258, which may be used by the chatbot retrieval module 260 to determine whether or not to recommend another chatbot to the user.

In an implementation, trigger contents of other chatbots such as chatbots 150, 160 may be provided in the chatbot index 258, and the chatbot retrieval module 260 may identify one of the chatbots 150, 160 is desired by the user based on the matching rates of the user input message and the trigger contents of the chatbots 150, 160. Then the chatbot communication module 280 may communicate with the identified chatbot in order to provide the services of the identified chatbot to the user.

In another implementation, a chatbot simulation module 270 may be established at the chatbot 200 or 140 to simulate other chatbots such as chatbots 150, 160. In this case the chatbot simulation function may be implemented as an application 124, and trigger contents of the other chatbots such as chatbots 150, 160 may be provided in the application index 256. The chatbot retrieval module 260 may identify one of the chatbots 150, 160 is desired by the user based on the matching rates of the user input message and the trigger contents of the chatbots 150, 160 in the application index 256. Then the chatbot simulation module 270 may simulate the role of the identified chatbot to provide the services of the identified chatbot to the user.

It should be appreciated that although it is described that the trigger contents of the chatbots are provided in the application index 256 and the chatbot index 258 respectively for the above mentioned two cases, the trigger contents of the chatbots in the both cases may be provided in one index, which may be the application index, or may be the chatbot index, or may be an index with another name. The disclosure is not limited to the name of the index and how the trigger content of the chatbots being distributed.

The responses determined by the core processing module 220 may be provided to a response queue or response cache 234. The responses in the response queue or response cache 234 may be further transferred to the user interface 210 such that the responses can be presented to the user in an proper order.

Figure 3:
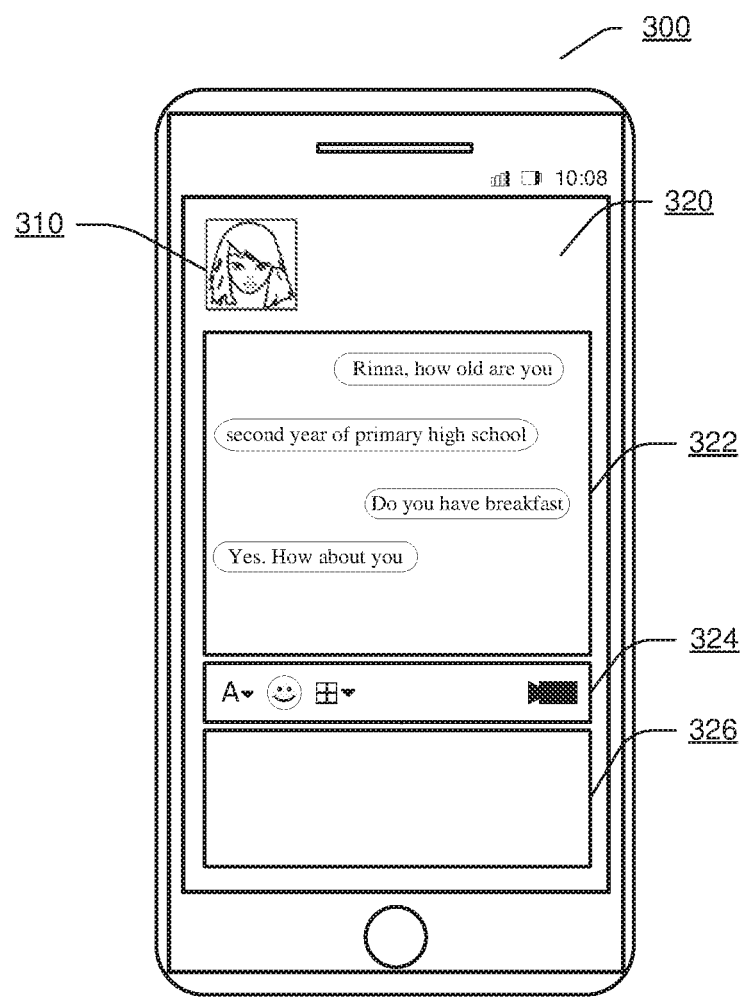
FIG. 3 illustrates an exemplary user interface (UI) according to an embodiment.

FIG. 3 illustrates an example of the UI 210. A chat window 320 is displayed on a computing device 300. The chat window 320 comprises a presentation area 322, a control area 324 and an input area 326. The presentation area 322 presents queries and responses in a conversation between a user and a chatbot, which is represented by the icon 310. The control area 324 includes a plurality of virtual buttons for the user to perform message input settings. For example, the user may make a voice input, attach image file, select emoji symbols, and make a short-cut of current screen, and so on through the control area 324. The input area 326 is used for the user to input messages. For example, the user may type text through the input area 326. The control area 324 and the input area 326 may be collectively referred to as input unit. The user may also make a voice call or video conversation with the AI chatbot though the input unit.

For example, in the UI as shown in FIG. 3, the user inputs a message "Rinna, how old are you" as a query, and a message "second year of primary high school" may be output by the chatbot as a response. Similarly, the user inputs a message "do you have breakfast" as a query, and a message "Yes, How about you" may be outputted by the chatbot as a response. Here. Rinna is the name of the AI chatbot, which may also be referred to as AI chat system.

Figure 4:
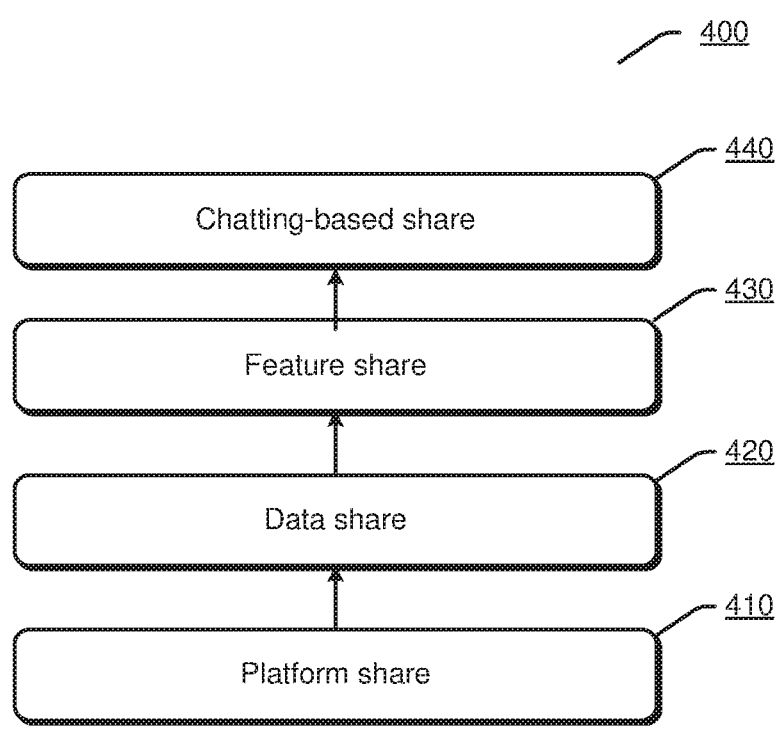
FIG. 4 illustrates exemplary hierarchical layers of data sharing between chatbots according to an embodiment.

FIG. 4 illustrates exemplary hierarchical layers of communication among chatbots.

Four layers of communication among chatbots are illustrated, that is, platform share 410, data share 420, feature share 430 and chatting based share 440, from deep sharing to shallow sharing.

Two chatbots can execute platform share 410 when they exactly share the same platform, for example, the <question, answer> index, the ranking/generating models, the user log management system and so on. This layer of sharing is used to build chatbot variants based on the similar data resources and machine learning models.

Two chatbots can be limited to data share 420. The data includes part of the <question, answer> index, user log data and other types of data. For example, for a general pure-chat chatbot and a domain-specific flight-booking chatbot, if the flight-booking related data can be shared with the general chatbot, then the flight-booking function and other related functions such as flight-retrieving, flight-transferring and so on can be implemented in the general chatbot based on the shared data.

Two chatbots can be limited to feature share 430. For example, a flight-booking chatbot can own numerous features such as flight-booking, hotel-booking, taxi-calling and so on. The term feature refers to an application such as the application 124 implemented by a chatbot such as the flight-booking chatbot. Only the functions of one or more features can be shared between two chatbots at the layer of feature share 430.

The communication among chatbots at the layer 410, 420 or 430 requires that the chatbots to be aware of each other, so as to allow the relative deep sharing among the chatbots on these layers.

Two chatbots can only share their information through chatting as illustrated at the chatting-based share layer 440. That is, a first chatbot can perform conversation with a second chatbot, like a user performing conversation with the second chatbot. In this way, the second chatbot is not necessary to be aware of the existence of the first chatbot. Therefore the first chatbot may incorporate the services of various available second chatbots universally based on the chatting-based share, without the limitation of the two chatbots being aware of each other.

Figure 5:
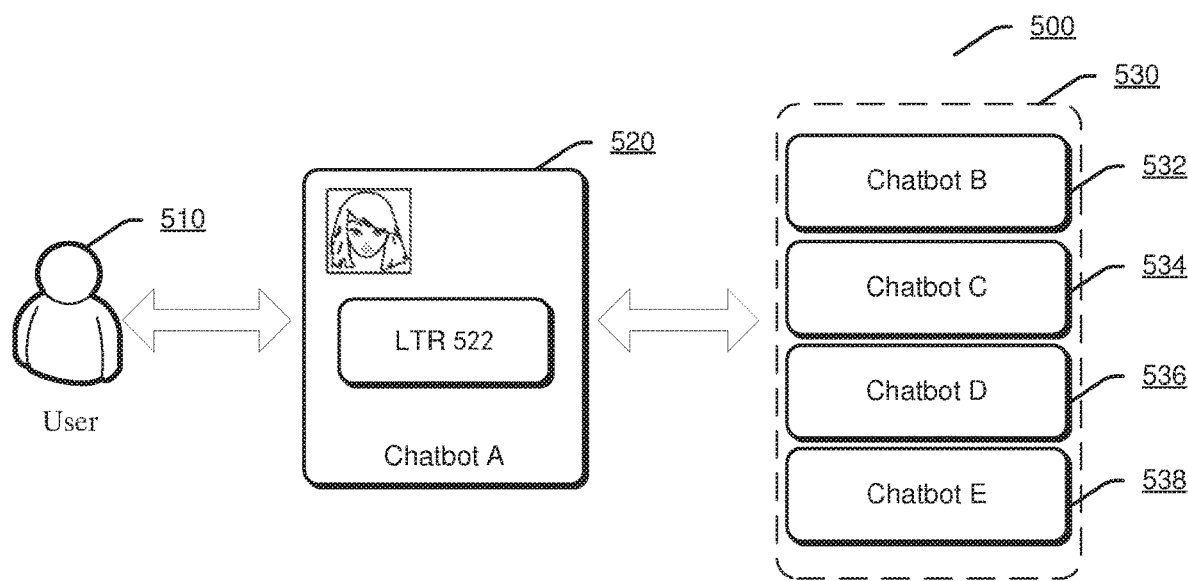
FIG. 5 illustrates an exemplary framework among users and chatbots according to an embodiment.

FIG. 5 illustrates an exemplary framework for providing services of various domain specific chatbots to a user via a general chatbot according to an embodiment.

In the exemplary framework 500, a user 510 may perform a conversation with a chatbot A 520 through intelligent automated chatting. The chatbot retrieval module 260 illustrated in FIG. 2 is implemented as a learn-to-rank (LTR) model 522 at the chatbot A. The LTR model 522 retrieves available and optimal chatbots that match the user's specific intensions of consuming or emotional connection requirements. In an implementation, the LTR model 522 scores matching rates between a message received from the user and trigger contents of other artificial intelligence entities 530 such as chatbots B 532, C 534, D 536, E 538 and so on. The LTR model 522 selects one of the other artificial intelligence entities 530 based on the matching rates, to provide a service of the selected artificial intelligence entity to the user.

In the exemplary framework illustrated in FIG. 5, in order to provide the service of the selected artificial intelligence entity such as chatbot B to the user, the chatbot A establishes a conversation with the chatbot B. Some approaches may be used for the chatbot A to establish a conversation with the chatbot B. For example, the chatbot A may preregistered with the chatbot B as a user of the chatbot B. As another example, the chatbot A may send queries and receive responses through web APIs of the chatbot B, where the web APIs are usually provided to implement the chatbot B in a manner of web application.

The chatbot A receives queries from the user in the conversation between the chatbot A and the user and forwards the queries to the chatbot B in the conversation between the chatbot A and the chatbot B. Then the chatbot A receives corresponding responses from the chatbot B in the conversation between the chatbot A and the chatbot B and forwards the responses to the user in the conversation between the chatbot A and the user. In this process of providing the service of the chatbot B to the user via the chatbot A, the identity of the chatbot B may be presented to the user to indicate that it's the chatbot B that is chatting with the user. However, the chatbot B is not necessary to be aware of the presence of the user 510, and the chatbot B may just be aware of the presence of the chatbot A as its user. This is advantageous for the chatbot A to act as a unified platform to retrieve existing chatbots to provide specific AI service for the user, and is also advantageous for the chatbots 530 to be developed independent of the chatbot A.

Figure 6:
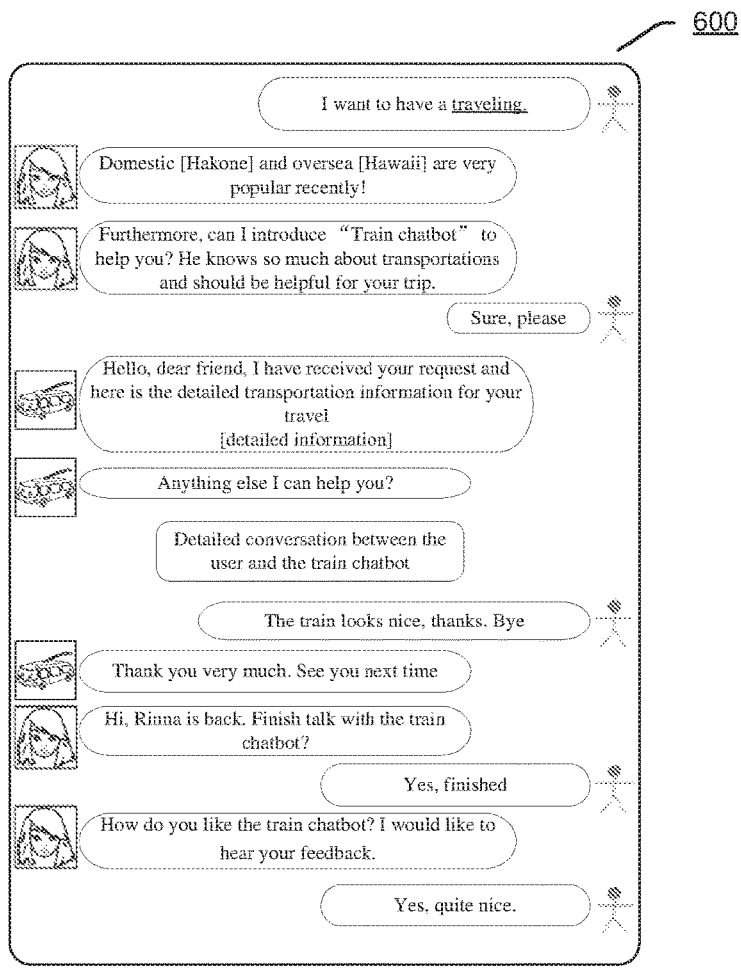
FIG. 6 illustrates an exemplary conversation flow according to an embodiment.

FIG. 6 illustrates an exemplary conversation flow under the framework 500 according to an embodiment.

The conversation flow may be implemented in the UI 320 as illustrated in FIG. 3, only the presenting area 322 is illustrated in FIG. 6 for sake of clarity. The icon of the human shape at the right of the interface 600 denotes a user such as the user 510, the icon of the young girl shape at the left of the interface 600 denotes the identity of chatbot A, and the icon of the train shape at the left of the interface 600 denotes the identity of a selected domain specific chatbot such as the chatbot B. The identity of a chatbot may also be referred to as the role or character of the chatbot.

As illustrated in FIG. 6, the chatbot A performs a conversation with the user by using its own identity. When a query "I want to have a traveling" is received from the user, the LTR model 522 identifies that a train chatbot B matches the user's query and may be desired for the user. Therefore the chatbot A recommends the train chatbot B to the user, for example, a response "Furthermore, can I introduce "Train chatbot" to help you? He knows so much about transportations and should be helpful for your trip" is output by the chatbot A to recommend the train chatbot B for the user.

The LTR model 522 may be implemented by using gradient boost decision tree (GBDT) for ranking available chatbots based on user's current query. For example, the current user query may be "I want to have a traveling" as illustrated in FIG. 6. Similar examples of the current user query may be "I want to go travel for somewhere", "It's summer holiday, I want to visit some far places", and so on. Each chatbot has its own trigger content, which may include textual description, title, and customized trigger word list of the chatbot. The trigger content may be provided in the chatbot index 258 and/or application index 256. Then the LTR model 522 scores the matching rates of the user's query and the trigger content of the chatbots by using the GBDT ranking algorithm.

In an implementation, a feature that may be used by the GBDT ranking algorithm may be the number of positive user feedbacks of a candidate chatbot. Taking the train chatbot as an example, the user feedbacks such as the illustrated "Yes, quite nice" are obtained after the end of the conversation between the train chatbot and the user, and are identified by a sentiment analysis (SA) model as positive, negative or neutral attitude.

In an implementation, a feature that may be used by the GBDT ranking algorithm may be an edit distance in word level between a query from the user and the trigger content of a candidate chatbot.

In an implementation, a feature that may be used by the GBDT ranking algorithm may be an edit distance in character level between the query from the user and the trigger content of a candidate chatbot. The feature is especially advantageous for similarity computing based on Asian languages such as Chinese and Japanese.

In an implementation, a feature that may be used by the GBDT ranking algorithm may be an accumulated word2vec similarity score between the query and the trigger content of a candidate chatbot. The accumulated word2vec similarity score may be implemented by using the following equations (1) and (0.2).

$$\text{Similarity}_1 = \Sigma_{w \text{ in query}}(\text{word2vec}(w, vx)) \quad (1)$$

where, w is a word in the query, vx is a word in the trigger content of the candidate chatbot and makes word2vec(w,v) the maximum among all words v in the trigger content.

$$\text{Similarity}_2 = \Sigma_{v \text{ in trigger content}}(\text{word2vec}(wx, v)) \quad (2)$$

where, v is a word in the trigger content of the candidate chatbot, wx is a word in the query and makes word2vec(w,v) the maximum among all words w in the query.

In an implementation, before computing accumulated word2vec similarity by using the equations (1) and (2), a high frequency phrase table may be used to pre-process the query and/or trigger content. For example, several high frequency words or characters may be pre-combined as one word or phrase based on the high frequency phrase table, and the pre-combined word or phrase is taken as a single word w or v in the equation (1) or (2). For example, the three words "New York City" may be pre-combined as one word or phrase "New_York_City".

In an implementation, a feature that may be used by the GBDT ranking algorithm may be BM25 score between the query and the trigger content of the candidate chatbot. Given a query Q, containing keywords $q_1, \ldots, q_n$, the BM25 score of a document (i.e., a trigger content or a trigger word list of a candidate chatbot) D is given as:

$$\text{score}(D, Q) = \sum_{i=1}^{n} IDF(q_i) \cdot \frac{f(q_i, D) \cdot (k_1 + 1)}{f(q_i, D) + k_1 \cdot \left(1 - b + b \cdot \frac{|D|}{avgdl}\right)}, \quad (3)$$

Where,
$f(q_i, D)$ is the term frequency of word $q_i$ in a document D, $f(q_i, D) = n$ if word $q_i$ occurs n (n>=1) times in document D and $f(q_i, D) = 0$ otherwise;
$|D|$ is the number of words in one document D;
Avgdl is the average document length of $|D|$ in the collection of documents; $k_1$ and b are free parameters, usually, such as $k_1 = 1.2$ and $b = 0.75$;

IDF($q_i$) is the inverse document frequency (IDF) weight of query word $q_i$. IDF($q_i$, D)=log(N/|D in Dx and $q_i$ in D|), where N is the total number of documents in the corpus or collection Dx, that is N=|Dx|, |D in Dx and $q_i$ in D| is the number of documents where term $q_i$ appears.

In an implementation, a feature that may be used by the GBDT ranking algorithm may be a monetary bid for a candidate chatbot. For example, a chatbot developer may bid for special trigger words to help triggering its chatbot in the general chatbot.

The LTR model 522 may score the matching rates of the current query and the candidate chatbots by using at least some of the above mentioned features, and may select at least one of the candidate chatbots for the user based on the matching rates. For example, the chatbot having the highest matching score may be recommended to the user. In the example as illustrated in FIG. 6, the train chatbot is recommended to the user by the general chatbot A.

After a receiving a positive answer from the user, such as "sure please" as illustrated in FIG. 6, a conversation with the user may be performed by using the identity of the train chatbot.

In the framework illustrated in FIG. 5, the chatbot A may send a query about the transport information of the traveling destination such as "Hakone" and "Hawaii" to the train chatbot B in the conversation between the chatbot A and the chatbot B, and may receive the responses from the chatbot B such as "Hello, dear friend. I have received your request and here is the detailed transportation information for your travel [detailed information]" and "Anything else I can help you?". The chatbot A forwards the responses of the chatbot B to the user in the conversation between the chatbot A and the user by using the identity of the chatbot B. The switching of the chatbot's identity in the conversation may be implemented in some ways. As an example, the chatbot A may prepare the icon indicating the identity of the chatbot B, and replace the icon indicating the identity of the chatbot A with the icon indicating the identity of the chatbot B when performing a conversation with a user by using the identity of the chatbot B. As another example, the icon indicating the identity of the chatbot B may be sent as a part of the response or together with the response from the chatbot B to the chatbot A, and may be presented in place of the chatbot A's icon in the conversation.

The conversation with the user by using the identity of the chatbot B, i.e., the conversation between the user and the chatbot B via the chatbot A, goes on until the user or the chatbot B ends the conversation, for example, "The train looks nice, thanks. Bye" input by the user or "Thank you very much. See you next time" input by the chatbot B indicates the end of the conversation between them. The chatbot A may identify the end of the conversation between the chatbot B and the user based on the query from the user and/or the response from the chatbot B, and may go back to the conversation with the user by using the identity of the chatbot A.

The chatbot A may send a question about the user's experience to the chatbot B, for example, "How do you like the train chatbot? I would like to hear your feedback" as illustrated. After receiving an answer from the user, such as "Yes, quite nice", the chatbot A may perform sentiment analysis on the answer to identify it as a positive or negative or neutral user feedback. And the user feedback may be used as a feature for triggering the chatbot B as discussed above.

Figure 7:
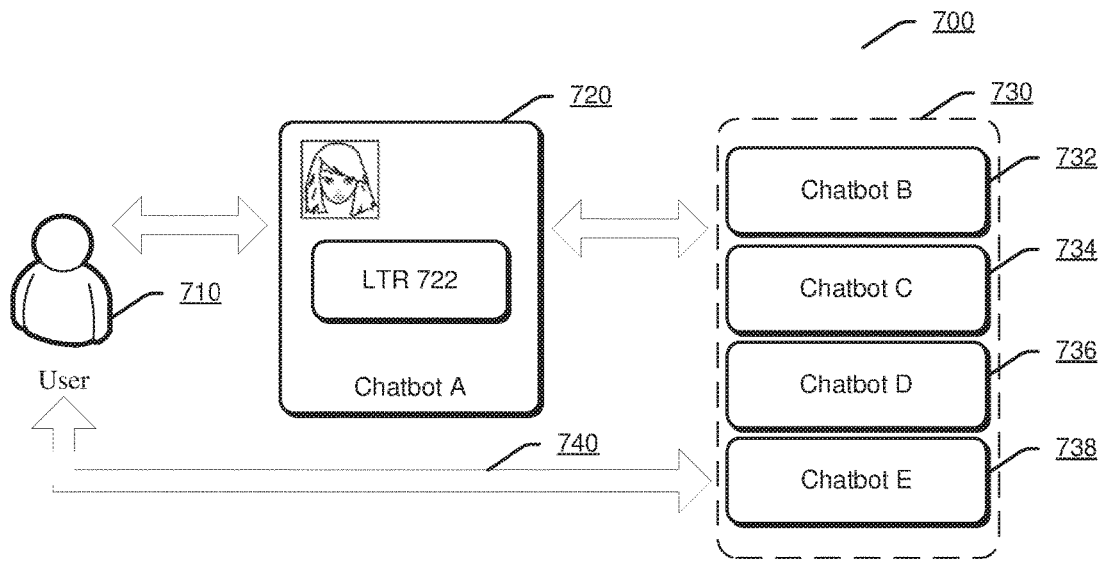
FIG. 7 illustrates an exemplary framework among users and chatbots according to an embodiment.

FIG. 7 illustrates an exemplary framework for providing services of various domain specific chatbots to a user via a general chatbot according to an embodiment.

In the exemplary framework 700, a user 710 may perform a conversation with a chatbot A 720 through intelligent automated chatting. The chatbot A 720 includes a LTR model 722 which is implemented in the same way as the LTR model 522. In an implementation, the LTR model 722 scores matching rates between a message received from the user 710 and trigger contents of chatbots 730 such as chatbots B 732, C 734, D 736, 7 538 and so on. The LTR model 722 selects one of the chatbots 530 based on the matching rates, to provide a service of the selected chatbot to the user by using the identity of the selected chatbot such as chatbot C 734.

In the exemplary framework illustrated in FIG. 7, in order to provide the service of the selected chatbot C to the user, the chatbot A helps to establish a conversation between the user 710 and the chatbot C 734. Some approaches may be used for the chatbot A to establish a conversation between the user and the chatbot C. For example, the chatbot A may send a request for activating the conversation between the chatbot C and the user by using the identification information of the user, then a new conversation between the chatbot C and the user may be established through a direct communication path 740 between them. As another example, the chatbot C may require that the user needs to add or accept the chatbot B as a friend before the user has the right to chat with the chatbot C. The chatbot A may provide the add-friend option of the chatbot C to the user, and after the user adds the chatbot C as friend, the chatbot A may activate the communication 740 between the chatbot C and the user automatically in the future usage instances of chatbot C.

Figure 8:
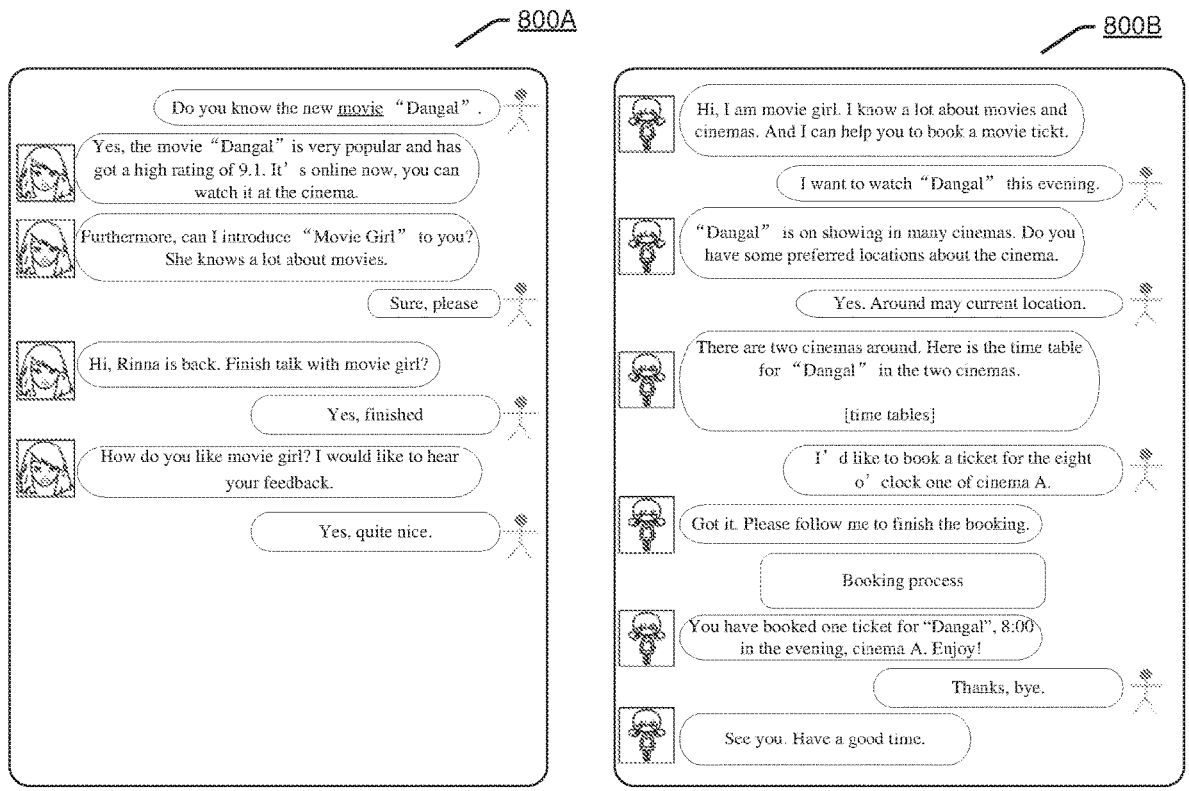
FIG. 8 illustrates an exemplary conversation flow according to an embodiment.

FIG. 8 illustrates an exemplary conversation flow under the framework 700 according to an embodiment.

The conversation flow may be implemented in the UI 320 as illustrated in FIG. 3, only the presenting area 322 is illustrated in FIG. 8 for sake of clarity. The icon of the human shape at the right of the interface 800A or 800B denotes a user such as the user 510, the icon of the young girl shape at the left of the interface 800A denotes the identity of chatbot A, and the icon of the little girl shape at the left of the interface 800B denotes the identity of a selected domain specific chatbot such as the chatbot C.

As illustrated in the interface 800A, the chatbot A performs a conversation with the user by using its own identity. When a query "Do you know the new movie "Dangal"" is received from the user, the LTR model 722 identifies that a movie chatbot C matches the user's query and may be desired for the user. Therefore the chatbot A recommends the movie chatbot C to the user, for example, a response "Furthermore, can I introduce "Movie Girl" to you? She knows a lot about movies" is output by the chatbot A to recommend the movie chatbot C for the user.

After receiving a positive answer from the user, such as "sure please" as illustrated in interface 800A, a conversation with the user may be performed by using the identity of the movie chatbot C. Specifically, the interface 800B presenting the conversation between the user and the movie chatbot C may appear in addition to the interface 800A. The interface 800B may be a popup window for the movie chatbot C to perform conversation directly with the user.

The detailed message flow in the conversation between the movie chatbot C and the user is illustrated in the interface 800B of FIG. 8. When the conversation between the movie chatbot C and the user is over, the conversation between the chatbot A and the user may continue. As an example, the chatbot A may monitor the conversation between the chatbot C and the user, and may identify the end of their conversation based on the messages such as "thanks, bye" from the user and/or "See you, Have a good time" from the chatbot C then the chatbot A may automatically continue its conversation with the user. As another example, the user may manually close the interface 800B or activating the interface 800A, and the chatbot A may receive a signal indicating the close of the interface 800B or the activation of the interface 800A. The chatbot A may takes the signal as the user's intention of ending the conversation with the chatbot C, and thus continue its conversation with the user at the interface 800A.

The chatbot A may send a question about the user's experience to the chatbot C, for example, "How do you like movie girl? I would like to hear your feedback" as illustrated. After receiving an answer from the user, such as "Yes, quite nice", the chatbot A may perform sentiment analysis on the answer to identify it as a positive or negative or neutral user feedback. And the user feedback may be used as a feature for triggering the chatbot C as discussed above.

Figure 9:
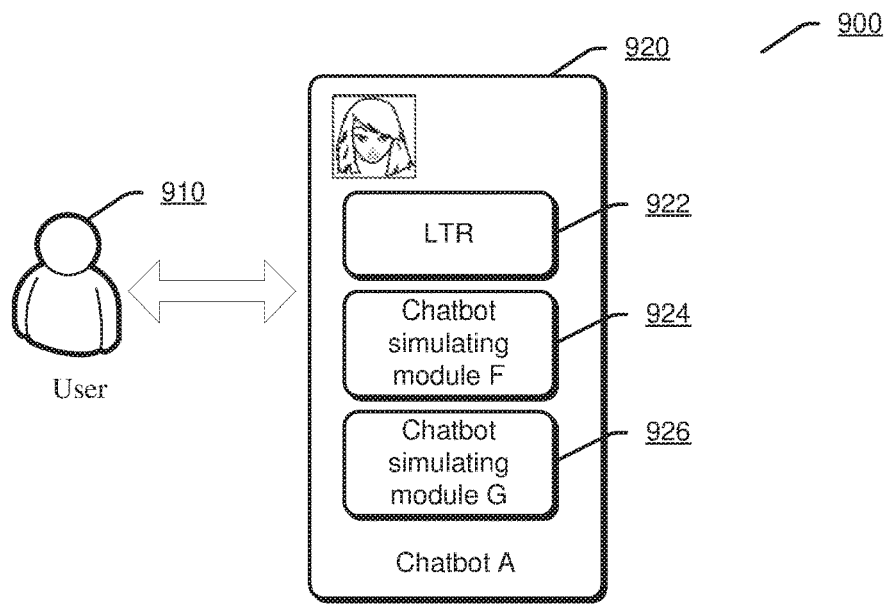
FIG. 9 illustrates an exemplary framework among users and chatbots according to an embodiment.

FIG. 9 illustrates an exemplary framework for providing services of various domain specific chatbots to a user via a general chatbot according to an embodiment.

In the exemplary framework 900, a user 910 may perform a conversation with a chatbot A 920 through intelligent automated chatting. The chatbot A 920 includes a LTR model 922 which is implemented in the same way as the LTR model 522. The chatbot A 920 includes chatbot simulating modules such as chatbot simulating modules F 924 and G 926. The chatbot simulating modules F 924 and G 926 are implemented at the chatbot A 920 to simulate existing chatbots F' and G'.

In an implementation, the LTR model 922 scores matching rates between a message received from the user 910 and trigger contents of chatbots such as chatbots F'. G' and so on. The LTR model 922 selects one of the chatbots based on the matching rates, to provide a service of the selected chatbot to the user by using the identity of the selected chatbot such as chatbot F'.

In the exemplary framework illustrated in FIG. 9, in order to provide the service of the selected chatbot F' to the user, the chatbot A activates the chatbot simulating module F 924 to generate responses for the user in the similar way as the chatbot F'.

Figure 10:
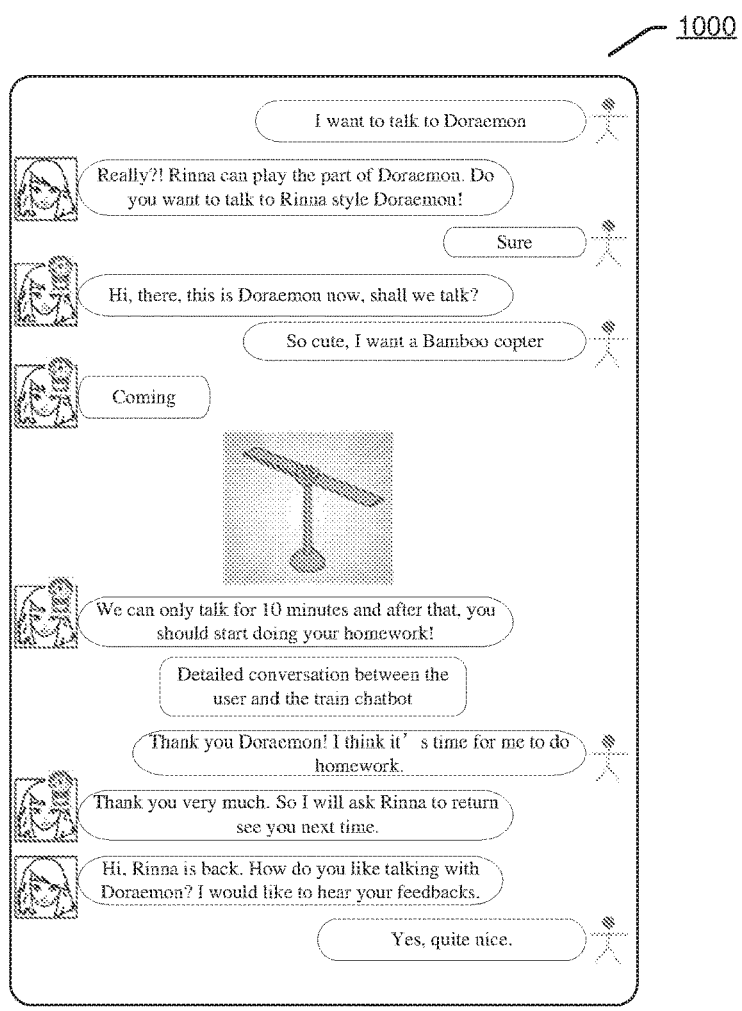
FIG. 10 illustrates an exemplary conversation flow according to an embodiment.

FIG. 10 illustrates an exemplary conversation flow under the framework 900 according to an embodiment.

The conversation flow may be implemented in the UI 320 as illustrated in FIG. 3, only the presenting area 322 is illustrated in FIG. 10 for sake of clarity. The icon of the human shape at the right of the interface 1000 denotes a user such as the user 910, the icon of the young girl shape at the left of the interface 1000 denotes the identity of chatbot A, and the icon of the you girl shape overlapped with the Doraemon at the left of the interface 1000 denotes the identity of a selected domain specific chatbot such as the Doraemon chatbot F'.

As illustrated in the interface 1000, the chatbot A performs a conversation with the user by using its own identity. When a query "I want to talk to Doraemon" is received from the user, the LTR model 922 identifies that the chatbot simulating module F matches the user's query based on the user's query and the trigger content of the module F. Therefore the chatbot A recommends the chatbot simulating module or function F to the user, for example, a response "Really?! Rinna can play the part of Doraemon. Do you want to talk to Rinna style Doraemon!" is output by the chatbot A to recommend the chatbot simulating function for the user.

After receiving a positive answer from the user, such as "sure" as illustrated in interface 1000, a conversation with the user may be performed by using the identity of the Doraemon chatbot F'. As illustrated, the indicator of the Doraemon chatbot F' is presented during the conversation with the user by using the identity of the Doraemon chatbot F'. Specifically, the identity indicator of the Doraemon chatbot F' is overlapped on the identity indicator of the chatbot A. It should be appreciated that there may be other suitable way for presenting the identity of the Doraemon chatbot F', for example, replacing the identity indicator of the chatbot A with the identity indicator of the Doraemon chatbot F', like the way illustrated in FIG. 6. Also, the overlapping of the two icons of the two chatbots may also be used instead of the train icon illustrated in FIG. 6.

The detailed message flow in the conversation with the user by using the Doraemon chatbot simulating module F is illustrated in the interface 1000 of FIG. 10. When the conversation between the simulated Doraemon chatbot F and the user is over, the chatbot A may send a question about the user's experience to the simulated Doraemon chatbot F, for example, "Hi, Rinna is back. How do you like talking with Doraemon? I would like to hear your feedbacks" as illustrated. After receiving an answer from the user, such as "Yes, quite nice", the chatbot A may perform sentiment analysis on the answer to identify it as a positive or negative or neutral user feedback. And the user feedback may be used by the LTR model 922 as a feature for triggering the simulated chatbot F as discussed above.

As illustrated in FIG. 10, the chatbot simulating module F 924 can simulate the speaking style of the existing Doraemon chatbot F'. In an implementation, the chatbot simulating module may be implemented through deep reinforcement learning, which may be performed based on chatting-based data sharing among chatbots. For example, the knowledge of fantasy characters related chatbots, such as Doraemon, Miki mouse and so on, may be learned by the chatbot A, which then can act as the learned chatbots to interact with the user.

Figure 11:
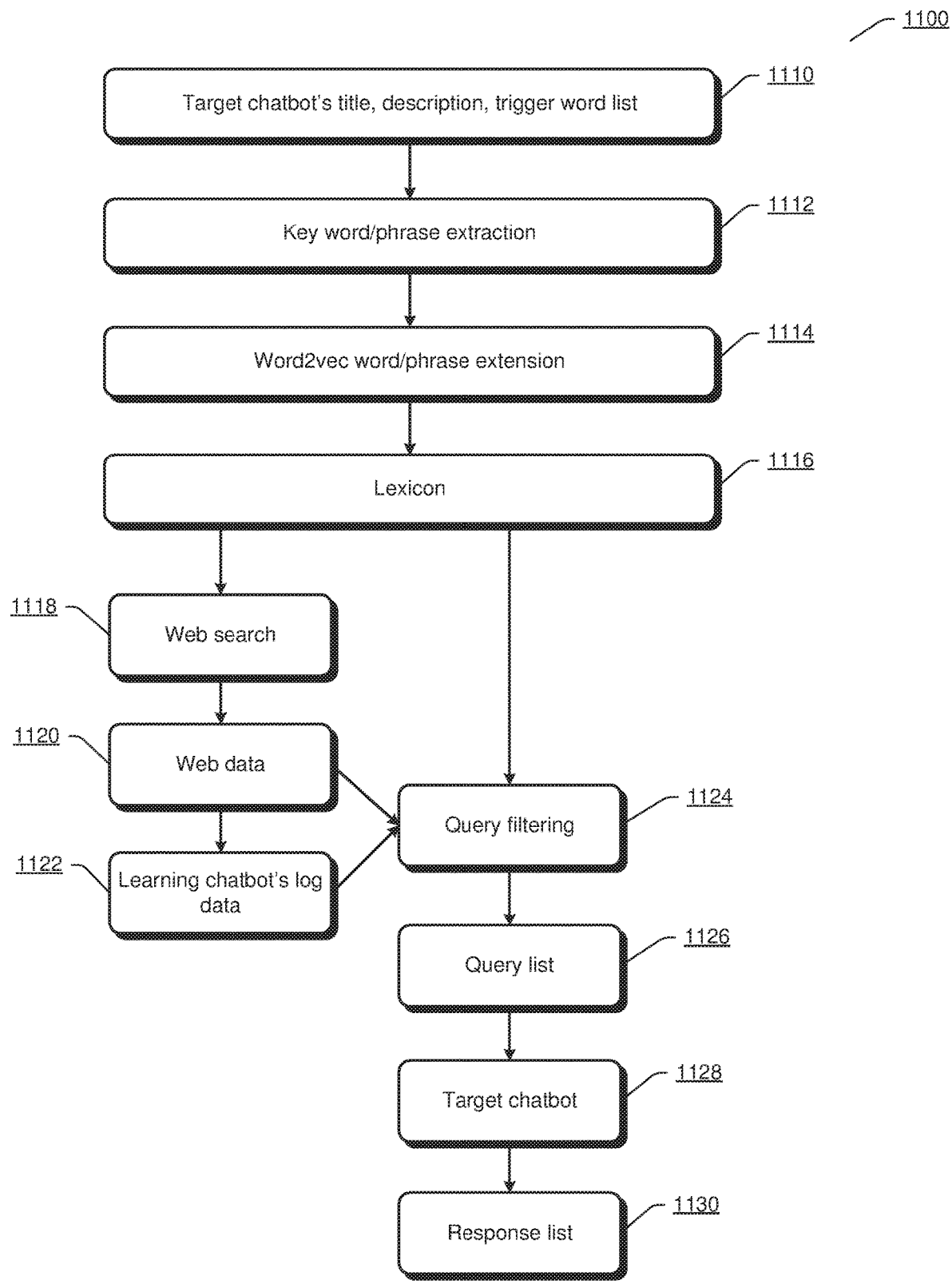
FIG. 11 illustrates an exemplary process for collection of query list and response list according to an embodiment.

FIG. 11 illustrates an exemplary process for collecting a query list of a target chatbot according to an embodiment.

In order to learn from a target chatbot based on chatting-based data sharing, a query list for the target chatbot may be prepared and the target chatbot's responses may be obtained for the list of queries through a conversation with the target chatbot. The knowledge of the target chatbot may be mined from the query list and the response list.

The process 1100 starts based on the target chatbot's information such as its title, description, trigger word list 1110. As discussed above, the title, description, trigger word list may be used as the trigger content 256 or 258 of the target chatbot, or only the trigger word list may be used as the trigger content of the target chatbot. In an implementation, the target chatbot's information may be obtained from its website on which introduction of the chatbot is usually available, and may be obtained from a knowledge website such as Wikipedia. In an implementation, the target chatbot's information may be obtained by feeding from its developer.

At 1112, a key word/phrase extraction may be performed on the target chatbot's information 1110 to obtain key words or phrases. The key word/phrase extraction may be implemented by using existing text process techniques such as sentence segmentation and word segmentation, Part-of-speech (POS) tagging, noun phrase extraction, named entity recognition (NER), predicate-argument parsing. For example, for a sentence "Doraemon travels back in time from the 22nd century to aid a pre-teen boy named Nobita Nobi", the exemplary key word "Doraemon", "Nobita Nobi", "pre-teen boy". "22nd century" may be extracted. It should be appreciated that this is only an illustrative example and the extraction results may be varying.

At 1114, a word/phrase extension may be performed based on the extracted words/phrases in order to obtain their synonyms. In an implementation, a word2vec based word/phrase extension may be performed to obtain the synonyms of the extracted words/phrases. Then the extracted words/phrases and their synonyms are collected as the seed lexicon 1116.

At 1118, a web search may be performed based on the seed lexicon 1116. For example, a search engine may perform the web search based on the words or phrases in the seed lexicon 1116 and obtain the related web data 1120.

At 1124, the seed lexicon 1116 may be used to filter the web data 1120 and available log data of the chatbot A or possible other chatbots to obtain a query list 1126. The log data may be <question, answer> index 254, may be pure chat index 252, may be user log data such as <query, response> pairs.

In an implementation, the query filtering 1124 may be performed on a basis of text string matching. For example, question sentences containing words/phrases of the lexicon 1116 are filtered out of the web data 1120 and/or the chatbot log data 1122, and may be used as the list of queries 1126.

At 1128, the list of queries are sent to the target chatbot. For example, the chatbot A may send the list of queries to the target chatbot in their conversation. The target chatbot generate responses for the queries, and thus a list of responses 1130 for the list of queries 1126 may be obtained from the target chatbot.

A list of <query, response> pairs of the target chatbot are obtained through the process of FIG. 11, and may be used as training data to train a chatbot simulating module. The process of FIG. 11 may be performed periodically in order to obtain updated training data. It should be appreciated that, even for the same query list 1126, the response list 1130 generated by the target chatbot may be different at different times because the target chatbot itself may also be updated.

Figures 12, 12A:
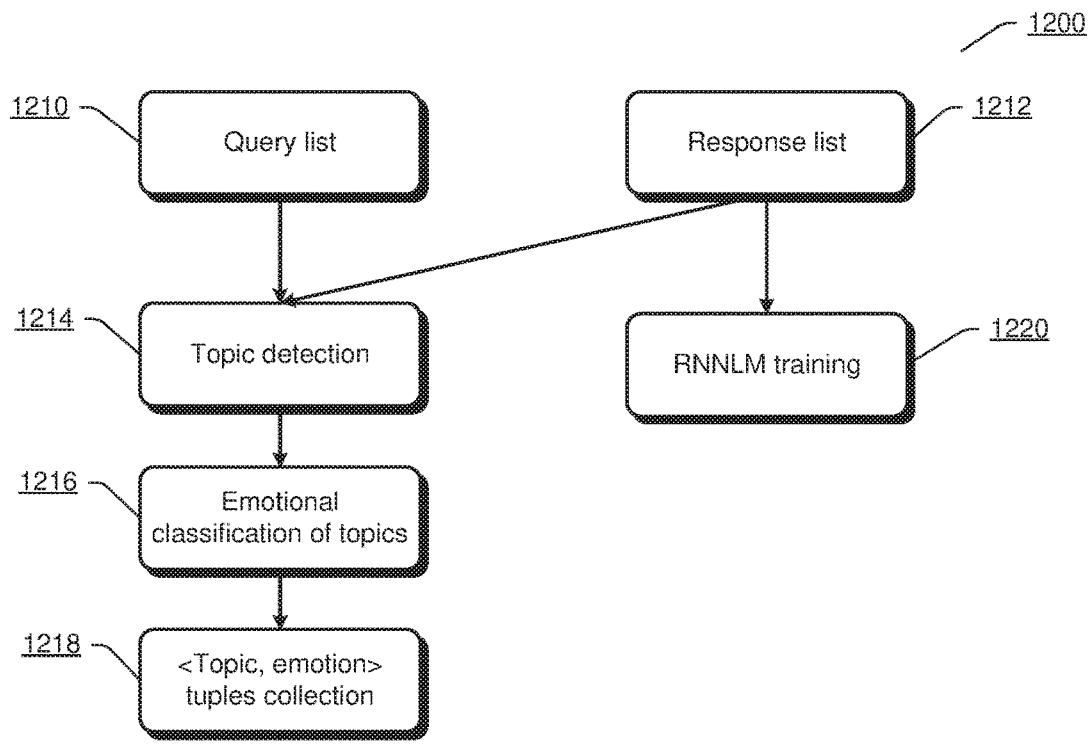
FIG. 12 illustrates an exemplary process for obtaining topic-emotion data and speaking style data according to an embodiment.
FIG. 12A illustrates an exemplary process for obtaining topic-emotion tuples according to an embodiment.

FIG. 12 illustrates an exemplary process for obtaining emotion data and speaking style data of the target chatbot according to an embodiment.

In order to learn the characteristics of a target chatbot, the speaking style of the target chatbot, such as the frequently used words, and the emotions of numerous topics of the target chatbot may be utilized to train the chatbot simulating module.

At 1214, topics are detected from the query list 1210 and the response list 1212 of the target chatbot.

FIG. 12A illustrates an exemplary process for detect topics from an exemplary <query, response> pair, which is "Does nobita like study?. Nobita doesn't like study. But you should learn from Sizuka, she studies so hard" 1230.

A preprocessing may be performed on the pair of query and response firstly. The preprocessing may include a sentence segmentation and word segmentation, Part-of-speech (POS) tagging, noun phrase extraction, named entity recognition (NER).

The sentence segmentation utilizes the punctuations such as period, question mark, exclamation mark and so on to separate a document into a set of sentences. The word segmentation separates words as well as punctuation by adding for example space symbol among them. Part-of-speech (POS) tagging is used to add POS tag for words in the sentence. Then, given a POS-tagged sequence or sentence, the noun phrase extraction process may be performed to recognize noun phrases using a list of heuristic rules. Then, the NER process may be used to identify the named entities in the sequence or sentence, the named entity may be person's name, location, organization, and phrases that describe timestamp or time period.

Each of the sentence/word segmentation, POS tagging, noun phrase extraction, NER employed in the preprocessing stage may be implemented by using existing techniques. However it should be appreciated that the combination of these processes in the preprocessing stage can effectively extract necessary information from sentences in order to construct the topic knowledge graph.

Then a coreference resolution of pronouns and normal nouns may be performed for the sentences. Taking the data 1230 as an example, the data "Does nobita like study?", "Nobita doesn't like study. But you should learn from Sizuka, she studies so hard." may be preprocessed to obtain the texts "Does nobita like study?", "Nobita doesn't like study." and "But you should learn from Sizuka, she studies so hard."

A machine learning model referred to as coreference resolution model may be trained to compute the probabilities of the candidate named entities for one given pronoun such as "he", "she" and so on, or for one given normal noun such as "the director", "the president" and so on.

Suppose wi is one named entity, such as "Sizuka" in the sentence, and wj is another noun phrase, such as "she" in the sentence, the task of the coreference resolution model is to determine whether wi and wj have the similar meaning or pointing to the same entity. In an implementation, the following features are utilized in the coreference resolution model.

Whether wi and wj appear in one sentence;
Is wi a pronoun?
The edit distance between wi and wj in character level;
Are wi and wj share a same POS tag?
When a word is a pronoun, whether another word is a name?

By using these features, a similarity score between the two words may be computed and a binary result indicating whether the two words refer to the same entity may be obtained. It should be appreciated that more or less features may be used for the coreference resolution model.

As illustrated at 1232 of FIG. 12A, the coreference resolution model may identify that the pronoun "she" point to the same entity as "Sizuka", and thus the pronouns "she" is replaced with the named entity "Sizuka".

Then a syntactic and semantic parsing process may be performed on the text sequences or sentences to obtain the syntactic dependency structure and semantic role labeling of the sentences. An example of the syntactic dependency structure and semantic role labeling of the sentences is illustrated at 1234 of FIG. 12A, where the structures and labeling are denoted by the arcs.

Topic knowledge may be extracted from the parsed sentences. Taking the sentences illustrated at 1234 as an example, the topics "Nobita study" and "Sizuka study" are obtained from the text of the sentences shown at 1234. In addition, opinions "not like", "hard" related to the topics "Nobita study" and "Sizuka study" may also be obtained.

At 1216, sentiment analysis (SA) may be performed to the sentence to obtain the emotional classification of the topics. The SA score indicates the target chatbot's emotion on the topic. The SA score may be in a range of [0, 1] where 0.5 indicate neutral, 0 indicates negative, and 1 indicates positive. It should be appreciated that the SA score is not limited to three classes, and there may be more classes to indicate finer emotional classification.

At 1218, the detected topic and the corresponding emotional classification are collected as emotion data, which may be in the form of <topic, emotion> tuples as illustrated at 1236, that is, <Nobita+study, negative> and <Sizuka+study, positive> which are detected from the exemplary <query, response> pair 1230. In an alternative implementation, the opinion information may be included in the emotion data, which may be in the form of <topic, opinion, emotion> tuples, such as <Nobita+study, not like, negative> and <Sizuka+study, hard, positive>.

At 1220, the response list 1212 may be used to train a speaking style model. The speaking style model may be implemented by using a recurrent neural network based language model (RNNLM) that takes sentences as input and generate probabilities as output, and thus describes the speaking style of the target chatbot in a probabilistic way. The RNNLM may be implemented by using existing techniques, and improved RNNLM in the future may also be applicable in the disclosure.

For example, the speaking style of the target chatbot may be reflected by the frequently used words of the target chatbot, therefore the probabilities of words in a sentence that are computed by the RNNLM may represent the speaking style of the sentence, and accordingly the probability of the sentence, which may be combination of the probabilities of words in the sentence, may also represent the speaking style of the sentence. In an implementation, for a sentence "a b c" having three words "a", "b", "c", the probability of the sentence obtained by the RNNLM may be $P(a\ b\ c)=P(a)*P(b|a)*P(c|a, b)$, which indicates the speaking style of the sentence.

The above mentioned two types of knowledge, i.e., the topic-emotion data collected at 1218 and the speaking style data that may be obtained by the trained RNNLM, may be utilized in a deep learning based generation model to generate a response for a user's query.

Figure 13:
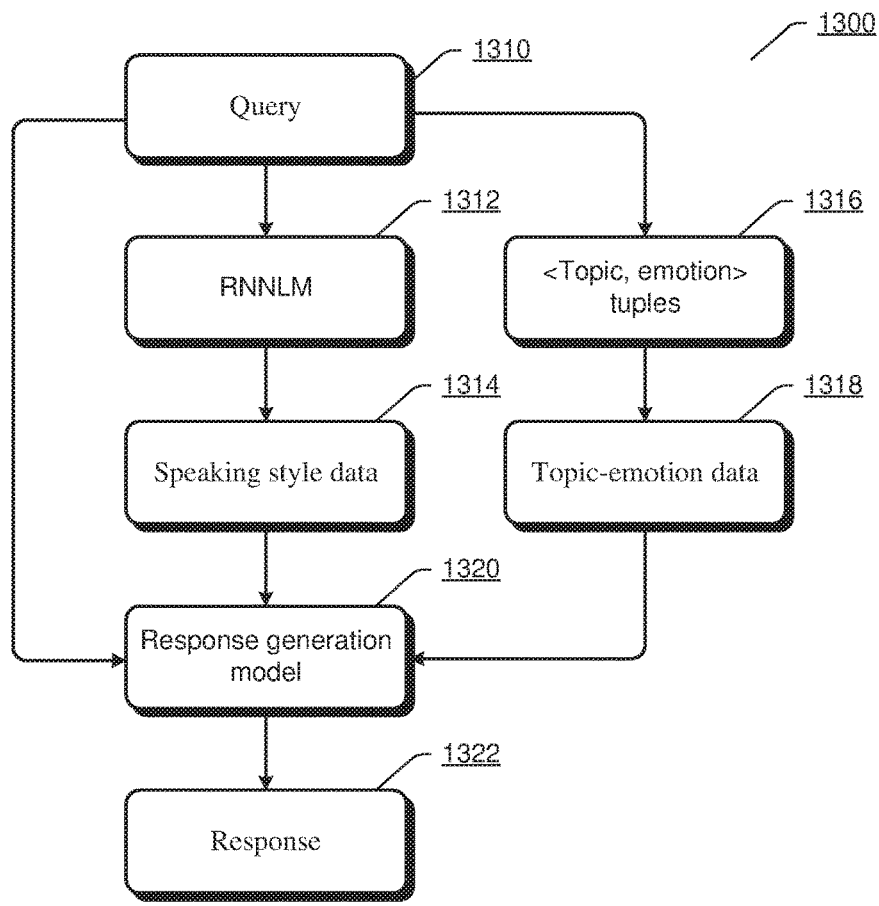
FIG. 13 illustrates an exemplary process for generating a response for a query according to an embodiment.

FIG. 13 illustrates an exemplary process 1300 for generating a response for a query according to an embodiment.

For a query 1310, the RNNLM 1312 takes the query as input and generate speaking style data 1314 for the query.

Topic-emotion data 1318 related to the query 1310 is obtained from the <topic, emotion> tuple collection 1316. For example, the query is "Does nobita like study?", the related tuple <nobita study, negative> may be obtained from the <topic, emotion> tuple collection 1316.

Then the query 1310, the speaking style data 1320 of the query and the topic-emotion data 1318 of the query may be taken as the input of the response generation model 1320, which may output a response 1322 for the query 1310. In an implementation, the response generation model 1320 may employ encoder-decoder algorithm to automatically generate a response for a query.

It should be appreciated that although the RNNLM 1312 and the <topic, emotion> tuple collection 1316 are illustrated as separate components from the response generation model 1320, the RNNLM 1312 and the <topic, emotion> tuple collection 1316 may also be regarded as parts of the response generation model 1320.

Figure 14:
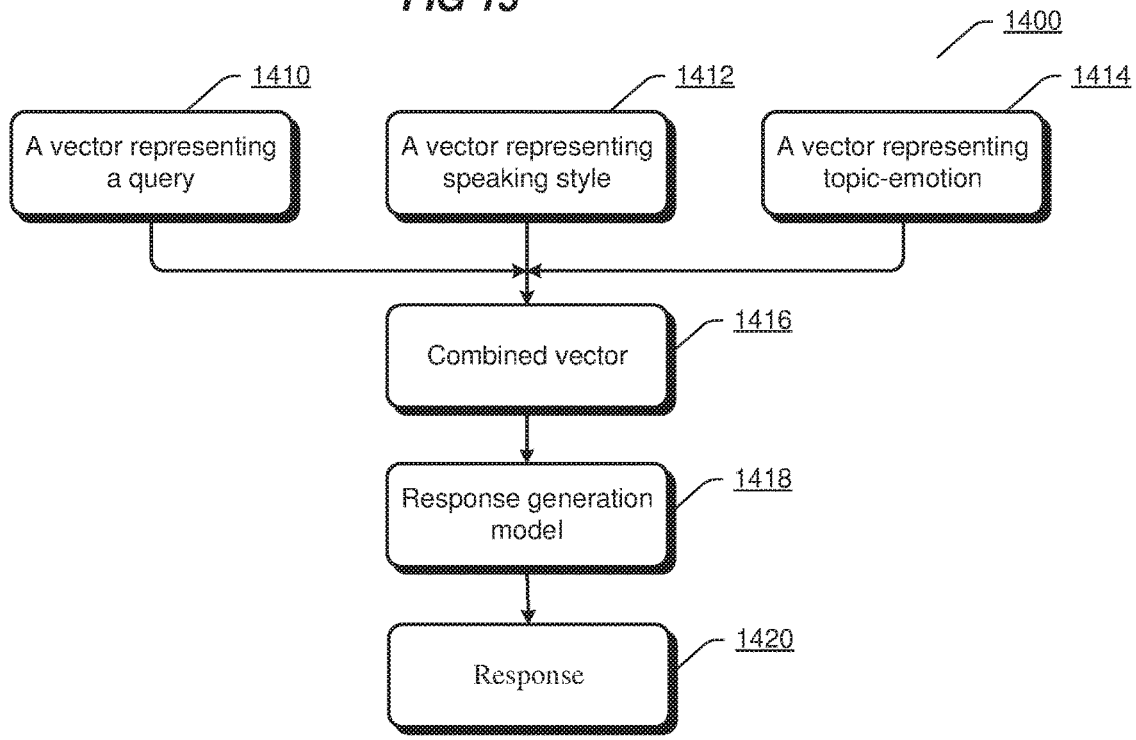
FIG. 14 illustrates an exemplary process for generating a response for a query according to an embodiment.

FIG. 14 illustrates an exemplary process for generating a response for a query according to an embodiment.

For the given query 1310, a first vector 1410 may be generated by mapping the query into the vector space. Recurrent Neural Network (RNN) may be adopted to perform sentence encoding so as to map the query into the vector space. Various techniques may be used for the RNN sentence encoding, such as, Long-Short Term Memory (LSTM), Gated-recurrent Unit (GRU), etc. In an implementation, the first vector may be an n-dimension vector, an example of n is 100. The elements of the vector may be floating numbers.

A second vector 1412 may be generated for the given query 1310 to represent the speaking style of the query 1310. In an implementation, a probability of the query 1310 is generated by the RNNLM, and the query 1310 is mapped into a (n−1)-dimension vector, then the n-dimension second vector 1412 is obtained by combining the (n−1) elements in the (n−1)-dimension vector and the probability as one element. In another implementation, the second vector 1412 may be set as a constant such as all zero.

A third vector 1414 may be generated for the given query 1310 to represent the topic-emotion of the query 1310. In an implementation, the topics words related to the query is mapped into a (n−1)-dimension vector, then the n-dimension third vector 1414 is obtained by combining the (n−1) elements in the (n−1)-dimension vector and the corresponding emotion data in the tuple as one element. For example, for a tuple <Nobita study, negative> related to the query, the words "Nobita study" is mapped to a (n−1)-dimension vector, which is combined with "0" representing "negative" to form the third vector 1414. In another implementation, for the triple <topic, opinion, emotion>, the words of the topic and opinion are mapped into the (n−1)-dimension vector, which is combined with "emotion" element to form the third vector 1414.

The three vectors 1410 to 1414 are combined to obtain a $3n$-dimension vector 1416, which is taken as input of the response generation model 1418 to generate a response 1420.

It should be appreciated that the response generation process as described in FIG. 13 and FIG. 14 is same for the training stage and the using stage of the generation model.

Figure 15:
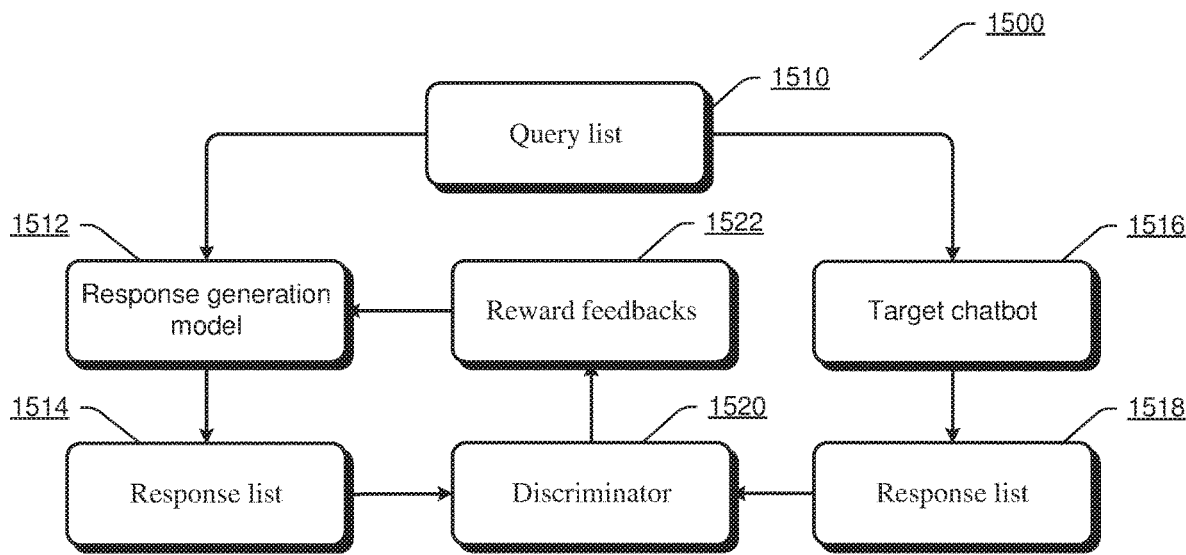
FIG. 15 illustrates an exemplary process for training a response generation model according to an embodiment.

FIG. 15 illustrates an exemplary process for training a deep learn based response generation model according to an embodiment.

A Generative Adversarial Net (GAN) is employed to train the chatbot simulating model or the response generation model. The GAN uses a discriminative model 1520 to guide the training of the generative model 1512.

A list of queries 1510 are sent to response generation model 1512 and target chatbot 1516. The response generation model 1512 includes the RNNLM. <topic, emotion> tuple collection and response generation model 1320 as illustrated in FIG. 13. The three parts are not illustrated separately in FIG. 15 for sake of clarity.

A first list of responses 1514 are generated by the response generation model 1512, and a second list of responses 1518 are generated by the target chatbot 1516.

The discriminator 1520 classifies the responses in the second list as True, and classifies the responses in the first list as True or False based on a threshold setting. For each iteration, rewards 1522 (or punishments of gradients 1522) are passed back through the discriminator and are backward propagated to the generator 1512. This whole process of updating the generator and discriminator follows a deep reinforcement learning way and the framework of the GAN network.

Through numerous iterations, the generation model 1512 may be trained to exactly follow the function or talking content and style of the target chatbot 1516, and the discriminator 1520 cannot make an accurate judgement anymore.

Figure 16:
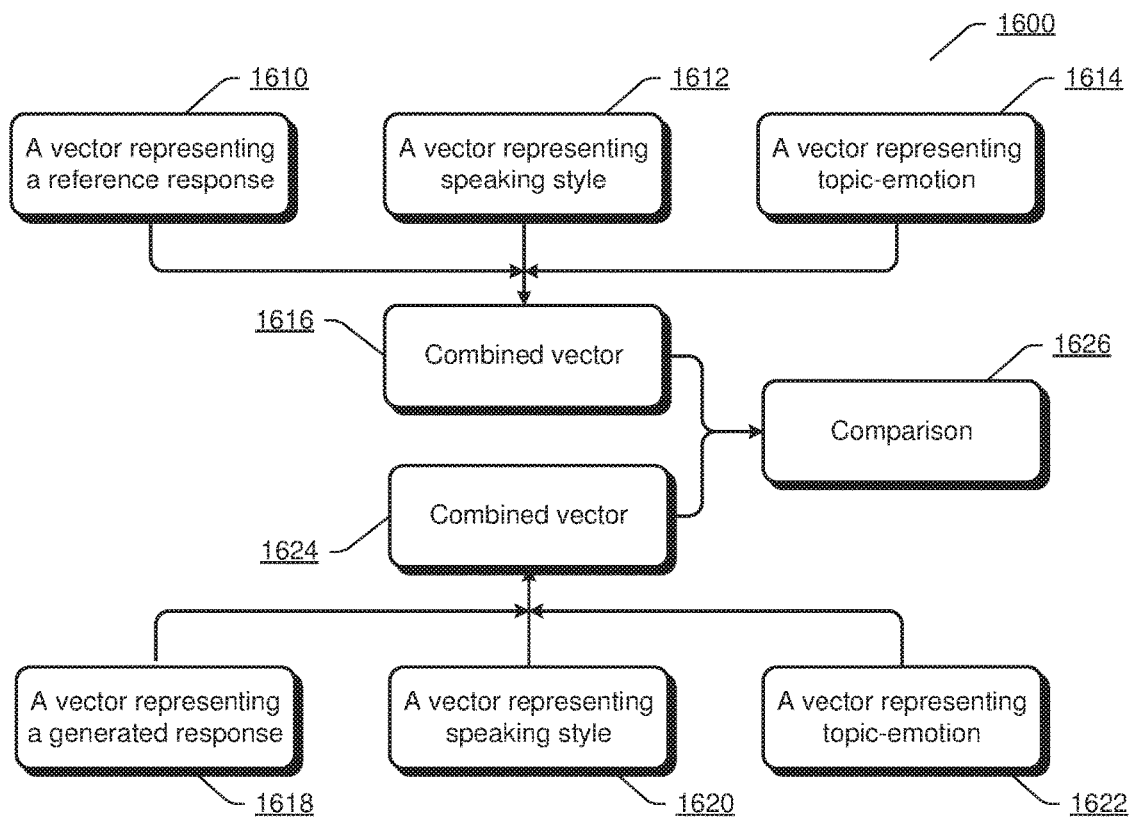
FIG. 16 illustrates an exemplary process for classifying a generated response according to an embodiment.

FIG. 16 illustrates an exemplary process for classifying a response as true or false according to an embodiment.

At the discriminator 1520, for a reference response generated by the target chatbot, a first vector 1610 representing the reference response, a second vector 1612 representing the speaking style of the reference response, a third vector 1614 representing topic-emotion of the reference response are generated. The generation of the vectors 1610 to 1614 based on the reference response, the RNNLM and the tuple collection is similar as the generation of the vectors 1410 to 1414 based on the query, the RNNLM and the tuple collection as discussed above with reference to FIG. 14. The three vectors 1610 to 1614 are combined to obtain a vector 1616.

For a generated response from the deep learning model 1512, a first vector 1618 representing the generated response, a second vector 1620 representing the speaking style of the generated response, a third vector 1622 representing topic-emotion of the generated response are generated. The generation of the vectors 1618 to 1622 based on the generated response, the RNNLM and the tuple collection is similar as the generation of the vectors 1410 to 1414 based on the query, the RNNLM and the tuple collection as discussed above with reference to FIG. 14, with an exception that a sentiment analysis is performed on the generated response to identify the its emotion classification, which is used to replace the emotion element in the related <topic, emotion> tuple. The reason is the generated response might be of an emotion classification different from the emotion element in the related <topic, emotion> tuple. The three vectors 1618 to 1622 are combined to obtain a vector 1624.

The combined vectors 1624 and 1616 are compared to classify the generated response as True or False at 1626. If the generated response is classified as a False response, the discriminator 1520 may provide a reward, which is generated based on the vectors 1624 and 1616, back to the generation model, and the generation model may be updated based on the reward.

In an implementation, the Cosine distance cos(v1, v2) of the two vectors v1 1624 and v2 1616 are computed to evaluate their similarity. The generated response is classified as a True response if the cosine distance cos(v1, v2) or its non-linear function log (cos(v1, v2)) is smaller than a threshold, and is classified as a False response otherwise. In an implementation, the reward can be defined as Reward=log (cos(v1, v2)), which is propagated back to the generation model 1512 to update the generation model 1512. On the other hand, the objective function of the discriminator 1520 is maximum likelihood function, for example, L=max Reward=max log(cos(v1, v2)).

In another implementation, a combined vector 1416 is computed for the query corresponding to the reference response and the generated response. A first cosine distance of the two vectors 1624 and 1416 and a second cosine distance of the two vectors 1616 and 1416 are calculated. The generated response is classified as a True response if the absolute difference between the first and second cosine distances is smaller than a threshold, and is classified as a False response otherwise.

Figure 17:
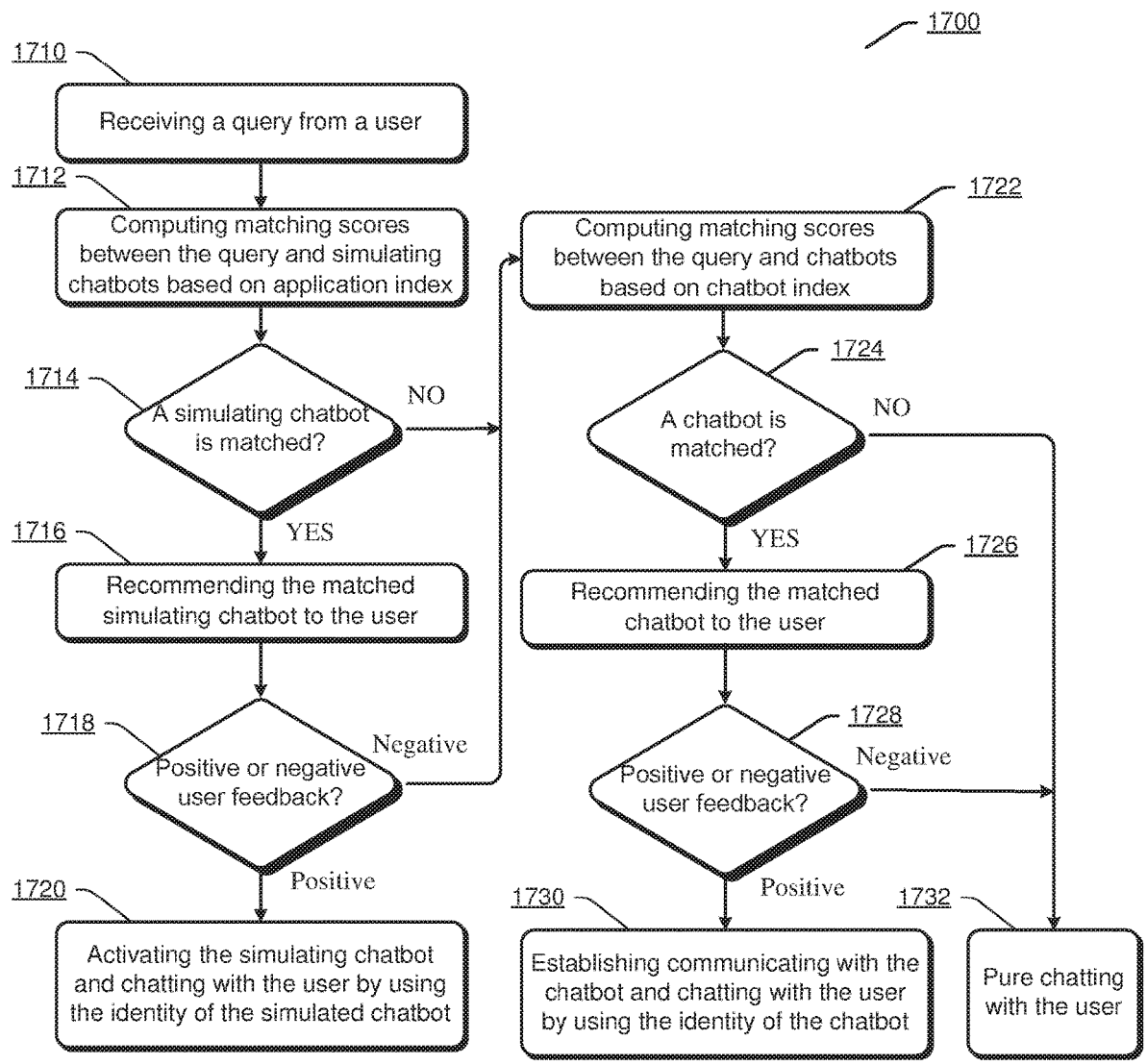
FIG. 17 illustrates an exemplary process for automated intelligence chatting according to an embodiment.

FIG. 17 illustrates an exemplary process for providing services of various chatbots on a unified platform according to an embodiment.

At 1710, a query is received from a user at the unified platform. The unified platform is a chatbot system, and may be referred to as a first chatbot.

At 1712, the first chatbot computes matching scores between the query and simulating chatbots based on trigger content of the simulating chatbots provided in the application index 256. The simulating chatbots implemented by the chatbot simulation module 270 may be managed as applications of the first chatbot, and thus their trigger contents may be provided in the application index 256.

At 1714, it is determined whether a simulating chatbot is matched based on the matching scores. For example, if the matching score of a simulating chatbot is higher than a threshold, the simulating chatbot is matched with the query. The process goes to 1716 if there is a matched simulating chatbot, and goes to 1722 otherwise.

At 1716, the first chatbot recommends the matched simulating chatbot to the user in the conversation with the user.

At 1718, it is determined whether the user's feedback is positive or negative. The determination may be implemented by performing sentiment analysis to the message from the user. The process goes to 1720 if the user's feedback is positive, and goes to 1722 if the user's feedback is negative.

At 1720, the first chatbot activates the matched simulating chatbot and chatts with the user by using the identity of the simulated chatbot.

At 1722, the first chatbot computes matching scores between the query and chatbots based on trigger content of the chatbots provided in the chatbot index 258.

At 1724, it is determined whether a chatbot is matched based on the matching scores. For example, if the matching score of a chatbot is higher than a threshold, the chatbot is matched with the query. The process goes to 1726 if there is a matched chatbot, and goes to 1732 otherwise.

At 1726, the first chatbot recommends the matched chatbot to the user in the conversation with the user.

At 1728, it is determined whether the user's feedback is positive or negative. The determination may be implemented by performing sentiment analysis to the message from the user. The process goes to 1730 if the user's feedback is positive, and goes to 1732 if the user's feedback is negative.

At 1730, communication with the chatbot is established and the conversation with the user is performed by using the identity of the matched chatbot. In an implementation, the first chatbot establishes communication with the matched chatbot, and chats with the user by using the identity of the matched chatbot through forwarding messages between the user and the matched chatbot, as described in FIGS. 5 and 6. In an implementation, the first chatbot helps establish communication between the matched chatbot and the user so as to enable the matched chatbot to chat with the user directly by using its identity, as described in FIGS. 7 and 8.

1732, the first chatbot performs pure chatting with the user.

It should be appreciated that although it is described at 1712 that the trigger contents of the simulating chatbots are provided in the application index 256, the simulating chatbots may also be managed as actual chatbots, and thus their trigger contents may be provided in the chatbot index 258.

It should be appreciated that although it is described in FIG. 17 that the recommendation of simulating chatbot is prior to the recommendation of actual chatbots, the disclosure is not limited to the specific order of recommendation.

Figure 18:
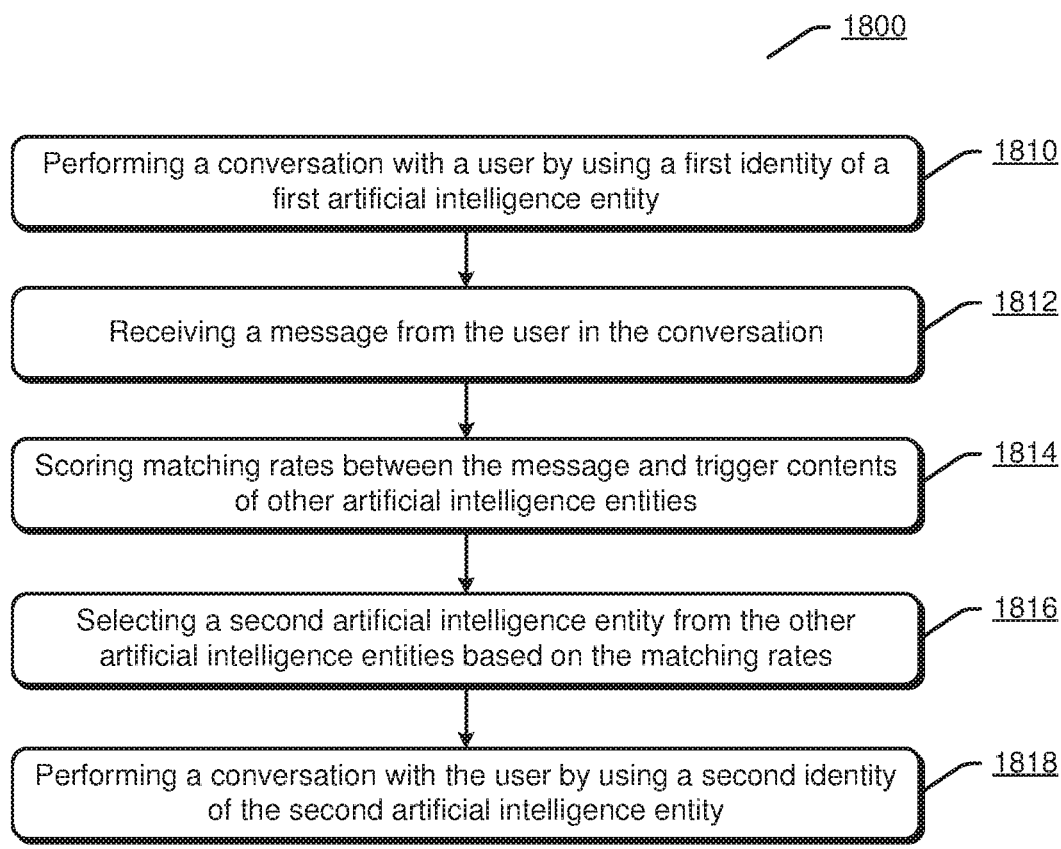
FIG. 18 illustrates an exemplary process for automated intelligence chatting according to an embodiment.

FIG. 18 illustrates an exemplary process for intelligent automated chatting according to an embodiment.

At 1810, a conversation with a user is performed by using a first identity of a first artificial intelligence entity.

At 1812, a message is received from the user in the conversation.

At 1814, matching rates between the message and trigger contents of other artificial intelligence entities are scored.

At 1816, a second artificial intelligence entity is selected from the other artificial intelligence entities based on the matching rates.

At 1818, a conversation with the user is performed by using a second identity of the second artificial intelligence entity by switching from the first identity of the first artificial intelligence entity to the second identity of the second artificial intelligence entity.

In an implementation, it is switched back from the second identity of the second artificial intelligence entity to the first identity of the first artificial intelligence entity when the conversation between the second identity of the second artificial intelligence entity and the user is over.

In an implementation, at 1818, a conversation or communication between the first artificial intelligence entity and the second artificial intelligence entity is established, messages received from the user are passed to the second artificial intelligence entity via the first artificial intelligence entity, and responses received from the second artificial intelligence entity are passed to the user via the first artificial intelligence entity.

In an implementation, the switching from the first identity of the first artificial intelligence entity to the second identity of the second artificial intelligence entity is implemented by replacing an identity indicator of the first artificial intelligence entity with an identity indicator of the second artificial intelligence entity in the conversation between the first artificial intelligence entity and the user.

In an implementation, the switching from the first identity of the first artificial intelligence entity to the second identity of the second artificial intelligence entity is implemented by presenting the identity indicator of the second artificial intelligence entity in the conversation between the first artificial intelligence entity and the user. For example, the identity indicator of the second artificial intelligence entity may be presented together with the identity indicator of the first artificial intelligence entity in the conversation between the first artificial intelligence entity and the user. For example, the identity indicator of the second artificial intelligence entity may be overlapped on the identity indicator of the first artificial intelligence entity in the conversation between the first artificial intelligence entity and the user.

In an implementation, the performing a conversation with the user by using the second identity of the second artificial intelligence entity is implemented by establishing a conversation between the second artificial intelligence entity and the user out of the conversation between the first artificial intelligence entity and the user.

In an implementation, at 1818, responses are generated for the messages by using a generation model at the first artificial intelligence entity, wherein the generation model simulates the second artificial intelligence entity, and the responses are sent from first artificial intelligence entity to the user by using the second identity of the second artificial intelligence entity.

In an implementation, a message from the user, speaking style data of the second artificial intelligence entity for the message, topic and emotion data of the message are taken as inputs of the generation model, and a response is generated for the message as output of the generation model based on the inputs.

In an implementation, the generation model is trained by using message-response pairs. The message-response pairs are collected by sending a list of messages to the second artificial intelligence entity and receiving a list of responses from the second artificial intelligence entity.

In an implementation, the list of messages are collected by generating a key word lexicon based on description data of the second artificial intelligence entity, and filtering at least one of web data and/or question-answer pairs of the first artificial intelligence entity based on the key word lexicon.

In an implementation, topic and emotion data of the second artificial intelligence entity are obtained from the message-response pairs. A language model is trained based on responses of the message-response pairs, wherein the language model generates speaking style data of the second artificial intelligence entity. The generation model is trained by using the message-response pairs, the topic and emotion data of the second artificial intelligence entity, and the speaking style data of the second artificial intelligence entity.

In an implementation, the generation model is trained by using a Generative Adversarial Net (GAN) which includes the generation model and a discriminative model. A vector representing a message of one of the message-response pairs, a vector representing a speaking style of the second artificial intelligence entity for the message, a vector representing topic and emotion of the message are combined into a first vector. A response is generated for the message by the generation model based on the first vector. A vector representing a reference response of the one of the message-response pairs, a vector representing a speaking style of the second artificial intelligence entity about the reference response, a vector representing topic and emotion of the reference response are combined into a second vector. A vector representing the generated response, a vector representing a speaking style of the second artificial intelligence entity about the generated response, a vector representing topic and emotion of the generated response are combined into a third vector. A reward is generated for the generation model based on the second vector and the third vector by the discriminative model. The generation model is updated based on the reward.

Figure 19:
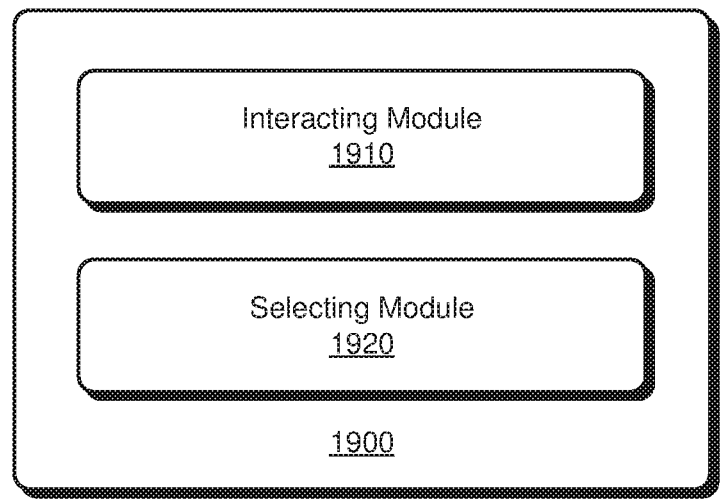
FIG. 19 illustrates an exemplary apparatus for automated intelligence chatting according to an embodiment.

FIG. 19 illustrates an exemplary apparatus for automated intelligence chatting according to an embodiment.

The apparatus 1900 includes an interacting module 1910 and a selecting module 1920. The interacting module 1910 performs a conversation with a user by using a first identity of a first artificial intelligence entity, and receives a message from the user in the conversation. The selecting module scores matching rates between the message and trigger contents of other artificial intelligence entities, and selects a second artificial intelligence entity from the other artificial intelligence entities based on the matching rates. The interacting module performs a conversation with the user by using a second identity of the second artificial intelligence entity by switching from the first identity of the first artificial intelligence entity to the second identity of the second artificial intelligence entity.

In an implementation, the interacting module 1910 switches back from the second identity of the second artificial intelligence entity to the first identity of the first artificial intelligence entity when the conversation between the second identity of the second artificial intelligence entity and the user is over.

In an implementation, the interacting module 1910 performs the conversation with the user by using the second identity of the second artificial intelligence entity by: establishing a conversation between the first artificial intelligence entity and the second artificial intelligence entity; passing messages received from the user to the second artificial intelligence entity via the first artificial intelligence entity;

and passing responses received from the second artificial intelligence entity to the user via the first artificial intelligence entity.

In an implementation, the interacting module 1910 switches from the first identity of the first artificial intelligence entity to the second identity of the second artificial intelligence entity by: replacing an identity indicator of the first artificial intelligence entity with an identity indicator of the second artificial intelligence entity in the conversation between the first artificial intelligence entity and the user; or presenting the identity indicator of the second artificial intelligence entity in the conversation between the first artificial intelligence entity and the user.

In an implementation, the interacting module 1910 performs the conversation with the user by using the second identity of the second artificial intelligence entity by: establishing a conversation between the second artificial intelligence entity and the user out of the conversation between the first artificial intelligence entity and the user.

In an implementation, the interacting module 1910 performs the conversation with the user by using the second identity of the second artificial intelligence entity by: receiving messages from the user by the first artificial intelligence entity; generating responses for the messages by using a generation model at the first artificial intelligence entity, wherein the generation model simulates the second artificial intelligence entity; and sending the responses from first artificial intelligence entity to the user by using the second identity of the second artificial intelligence entity.

In an implementation, the generation model generates responses for the messages by: taking a message from the user, speaking style data of the second artificial intelligence entity for the message, topic and emotion data of the message as inputs of the generation model; and generating a response for the message based on the inputs.

It should be appreciated that the apparatus 1900 may also comprise any other modules configured for performing any operations according to the various embodiments as mentioned above in connection with FIGS. 1-18.

Figure 20:
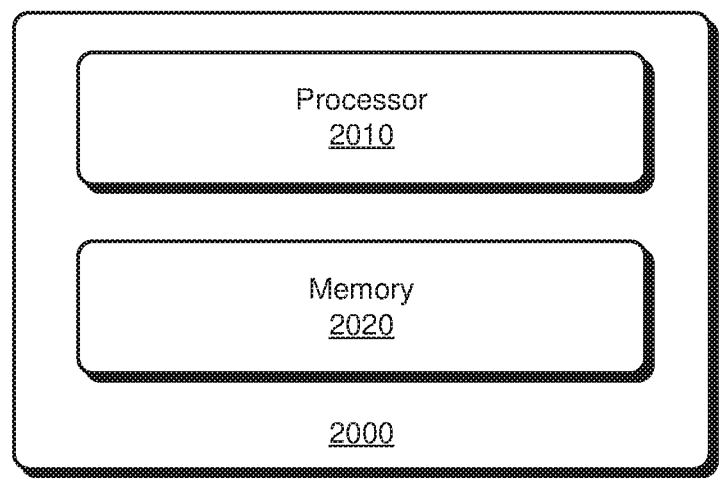
FIG. 20 illustrates an exemplary computing system according to an embodiment.

FIG. 20 illustrates an exemplary computing system according to an embodiment.

The system 2000 may comprise one or more processors 2010. The system 2000 may further comprise a memory 2020 that is connected with the one or more processors 2010.

The memory 2020 may store computer-executable instructions that, when executed, cause the one or more processors 2010 to perform a conversation with a user by using a first identity of a first artificial intelligence entity; receive a message from the user in the conversation; score matching rates between the message and trigger contents of other artificial intelligence entities; select a second artificial intelligence entity from the other artificial intelligence entities based on the matching rates; and perform a conversation with the user by using a second identity of the second artificial intelligence entity by switching from the first identity of the first artificial intelligence entity to the second identity of the second artificial intelligence entity.

It should be appreciated that the computer-executable instructions, when executed, cause the one or more processors 2010 to perform any operations of the processes according to the embodiments as mentioned above in connection with FIGS. 1-19.

The embodiments of the present disclosure may be embodied in a non-transitory computer-readable medium. The non-transitory computer-readable medium may comprise instructions that, when executed, cause one or more processors to perform any operations of the processes according to the embodiments as mentioned above.

It should be appreciated that all the operations in the processes described above are merely exemplary, and the present disclosure is not limited to any operations in the processes or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the disclosure. The functionality of a processor, any portion of a processor, or any combination of processors presented in the present disclosure may be implemented with software being executed by a microprocessor, microcontroller. DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for intelligent automated chatting, said method comprising:
   performing a conversation with a user by using a first identity of a first artificial intelligence entity having a first style;
   receiving a message from the user in the conversation;
   scoring matching rates between the message and trigger contents of other artificial intelligence entities;
   selecting a second artificial intelligence entity from the other artificial intelligence entities based on the matching rates, the second artificial intelligence entity having a second style that is different from the first style; and
   performing a conversation with the user by using a second identity of the second artificial intelligence entity by switching from the first identity of the first artificial intelligence entity to the second identity of the second artificial intelligence entity, wherein said switching includes causing the first artificial intelligence entity to simulate the second style of the second artificial intelligence entity, and wherein performing the conversation with the user by using the second identity of the second artificial intelligence entity comprises:
      receiving messages from the user by the first artificial intelligence entity;
      generating responses for the messages by using a generation module at the first artificial intelligence entity, wherein the generation module simulates the second artificial intelligence entity; and
      sending the responses from the first artificial intelligence entity to the user by using the second identity of the second artificial intelligence entity.

2. The method of claim 1, further comprising:
   switching back from the second identity of the second artificial intelligence entity to the first identity of the first artificial intelligence entity when the conversation between the second identity of the second artificial intelligence entity and the user is over.

3. The method of claim 1, wherein performing the conversation with the user by using the second identity of the second artificial intelligence entity comprises:
   establishing a conversation between the second artificial intelligence entity and the user out of the conversation between the first artificial intelligence entity and the user.

4. The method of claim 1, wherein the switching from the first identity of the first artificial intelligence entity to the second identity of the second artificial intelligence entity comprises:
   presenting an identity indicator of the second artificial intelligence entity together with an identity indicator of the first artificial intelligence entity in the conversation between the first artificial intelligence entity and the user; or
   replacing the identity indicator of the first artificial intelligence entity with the identity indicator of the second artificial intelligence entity in the conversation between the first artificial intelligence entity and the user.

5. The method of claim 1, wherein performing the conversation with the user by using the second identity of the second artificial intelligence entity comprises:
   establishing a conversation between the first artificial intelligence entity and the second artificial intelligence entity;
   passing messages received from the user to the second artificial intelligence entity via the first artificial intelligence entity; and
   passing responses received from the second artificial intelligence entity to the user via the first artificial intelligence entity.

6. The method of claim 5, wherein the switching from the first identity of the first artificial intelligence entity to the second identity of the second artificial intelligence entity comprises:
   replacing an identity indicator of the first artificial intelligence entity with an identity indicator of the second artificial intelligence entity in the conversation between the first artificial intelligence entity and the user; or
   presenting the identity indicator of the second artificial intelligence entity in the conversation between the first artificial intelligence entity and the user.

7. The method of claim 1, wherein the generating responses for the messages by using a generation module at the first artificial intelligence entity comprises:
   taking a message from the user, speaking style data of the second artificial intelligence entity for the message, topic and emotion data of the message as inputs of the generation module; and
   generating a response for the message based on the inputs.

8. The method of claim 7, wherein the generation module is trained by using message-response pairs, wherein the message-response pairs are collected by sending a list of messages to the second artificial intelligence entity and receiving a list of responses from the second artificial intelligence entity.

9. The method of claim 8, further comprising obtaining topic and emotion data of the second artificial intelligence entity from the message-response pairs;
   training a language model based on responses of the message-response pairs, wherein the language model generates speaking style data of the second artificial intelligence entity, wherein the generation module is trained by using the message-response pairs, the topic and emotion data of the second artificial intelligence entity, and the speaking style data of the second artificial intelligence entity.

10. The method of claim 8, wherein the generation module is trained by using a Generative Adversarial Net (GAN) which includes the generation module and a discriminative model, and the method comprises:
    combining a vector representing a message of one of the message-response pairs, a vector representing a speaking style of the second artificial intelligence entity for the message, a vector representing topic and emotion of the message into a first vector;
    generating a response for the message by the generation module based on the first vector, combining a vector representing a reference response of the one of the message-response pairs, a vector representing a speaking style of the second artificial intelligence entity about the reference response, a vector representing topic and emotion of the reference response into a second vector, combining a vector representing the generated response, a vector representing a speaking style of the second artificial intelligence entity about the generated response, a vector representing topic and emotion of the generated response into a third vector, generating a reward based on the second vector and the third vector; and
    updating the generation module based on the reward.

11. An apparatus for intelligent automated chatting, said apparatus comprising:
    an interacting module for performing a conversation with a user by using a first identity of a first artificial intelligence entity, and receiving a message from the user in the conversation, the first artificial intelligence entity having a first style; and a selection module for scoring matching rates between the message and trigger contents of other artificial intelligence entities, and selecting a second artificial intelligence entity from the other artificial intelligence entities based on the matching rates, the second artificial intelligence entity having a second style that is different from the first style;

the interacting module is further for performing a conversation with the user by using a second identity of the second artificial intelligence entity by switching from the first identity of the first artificial intelligence entity to the second identity of the second artificial intelligence entity, wherein said switching includes causing the first artificial intelligence entity to simulate the second style of the second artificial intelligence entity, and wherein performing the conversation with the user by using the second identity of the second artificial intelligence entity comprises:

receiving messages from the user by the first artificial intelligence entity;

generating responses for the messages by using a generation module at the first artificial intelligence entity, wherein the generation module simulates the second artificial intelligence entity; and sending the responses from the first artificial intelligence entity to the user by using the second identity of the second artificial intelligence entity.

12. The apparatus of claim 11, wherein the interacting module is further for:

switching back from the second identity of the second artificial intelligence entity to the first identity of the first artificial intelligence entity when the conversation between the second identity of the second artificial intelligence entity and the user is over.

13. The apparatus of claim 11, wherein the interacting module performs the conversation with the user by using the second identity of the second artificial intelligence entity by:

establishing a conversation between the second artificial intelligence entity and the user out of the conversation between the first artificial intelligence entity and the user.

14. The apparatus of claim 11, wherein the interacting module switches from the first identity of the first artificial intelligence entity to the second identity of the second artificial intelligence entity by:

presenting an identity indicator of the second artificial intelligence entity together with an identity indicator of the first artificial intelligence entity in the conversation between the first artificial intelligence entity and the user; or replacing the identity indicator of the first artificial intelligence entity with the identity indicator of the second artificial intelligence entity in the conversation between the first artificial intelligence entity and the user.

15. The apparatus of claim 11, wherein the generation module generates responses for the messages by:

taking a message from the user, speaking style data of the second artificial intelligence entity for the message, topic and emotion data of the message as inputs of the generation module; and generating a response for the message based on the inputs.

16. The apparatus of claim 11, wherein the interacting module performs the conversation with the user by using the second identity of the second artificial intelligence entity by:

establishing a conversation between the first artificial intelligence entity and the second artificial intelligence entity;

passing messages received from the user to the second artificial intelligence entity via the first artificial intelligence entity; and passing responses received from the second artificial intelligence entity to the user via the first artificial intelligence entity.

17. The apparatus of claim 16, wherein the interacting module switches from the first identity of the first artificial intelligence entity to the second identity of the second artificial intelligence entity by:

replacing an identity indicator of the first artificial intelligence entity with an identity indicator of the second artificial intelligence entity in the conversation between the first artificial intelligence entity and the user; or presenting the identity indicator of the second artificial intelligence entity together with the identity indicator of the first artificial intelligence entity in the conversation between the first artificial intelligence entity and the user.

18. A computer system comprising:

one or more processors; and a memory that stores computer-executable instructions that are executable by the one or more processors to cause the computer system to:

perform a conversation with a user by using a first identity of a first artificial intelligence entity having a first style;

receive a message from the user in the conversation;

score matching rates between the message and trigger contents of other artificial intelligence entities;

select a second artificial intelligence entity from the other artificial intelligence entities based on the matching rates, the second artificial intelligence entity having a second style that is different from the first style; and perform a conversation with the user by using a second identity of the second artificial intelligence entity by switching from the first identity of the first artificial intelligence entity to the second identity of the second artificial intelligence entity, wherein said switching includes causing the first artificial intelligence entity to simulate the second style of the second artificial intelligence entity, and wherein performing the conversation with the user by using the second identity of the second artificial intelligence entity comprises:

receiving messages from the user by the first artificial intelligence entity;

generating responses for the messages by using a generation module at the first artificial intelligence entity, wherein the generation module simulates the second artificial intelligence entity; and sending the responses from the first artificial intelligence entity to the user by using the second identity of the second artificial intelligence entity.

19. The computer system of claim 18, wherein multiple layers of communication between the first artificial intelligence entity and the second artificial intelligence entity are available, said multiple layers comprising a platform share, a data share, a feature share, and a chatting based share.

20. The computer system of claim 19, wherein:

the platform share occurs when the first and second artificial intelligence entities share a same platform, wherein the platform share facilitates in building variants of the first and second artificial intelligence entities,
the data share occurs when data is shared between the first and second artificial intelligence entities,
the feature share occurs when functions of an application are shared between the first and second artificial intelligence entities, and
the chatting based share occurs when information is shared between the first and second artificial intelligence entities during a chatting session.

* * * * *